US012489582B2

(12) United States Patent  
Awoniyi-Oteri et al.

(10) Patent No.: US 12,489,582 B2  
(45) Date of Patent: Dec. 2, 2025

(54) USER EQUIPMENT (UE) PHYSICAL LAYER MEASUREMENT REPORTING IN SECONDARY CELL GROUP (SCG) DORMANCY

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Punyaslok Purkayastha, San Diego, CA (US); Ozcan Ozturk, San Diego, CA (US); Huilin Xu, Temecula, CA (US); Peng Cheng, Beijing (CN); Junyi Li, Fairless Hills, PA (US); Sony Akkarakaran, Poway, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/926,894

(22) PCT Filed: Jul. 10, 2020

(86) PCT No.: PCT/CN2020/101456  
§ 371 (c)(1),  
(2) Date: Nov. 21, 2022

(87) PCT Pub. No.: WO2022/006904  
PCT Pub. Date: Jan. 13, 2022

(65) Prior Publication Data  
US 2023/0224129 A1 Jul. 13, 2023

(51) Int. Cl.  
*H04L 5/00* (2006.01)  
*H04L 1/00* (2006.01)  
(Continued)

(52) U.S. Cl.  
CPC .......... *H04L 5/0053* (2013.01); *H04L 1/0026* (2013.01); *H04L 5/0048* (2013.01); *H04W 52/0235* (2013.01); *H04W 72/232* (2023.01)

(58) Field of Classification Search  
CPC ... H04L 5/0053; H04L 1/0026; H04L 5/0048; H04L 1/0001; H04L 5/0073;  
(Continued)

(56) References Cited

U.S. PATENT DOCUMENTS 11,895,582 B2 *  2/2024  Zhou ..................... H04L 5/0032  
2014/0010182 A1 *  1/2014  Chunli .................. H04L 5/0053  
                                                                  370/329

(Continued)

FOREIGN PATENT DOCUMENTS

CN  102625355 A  8/2012  
CN  106332174 A  1/2017  
(Continued)

OTHER PUBLICATIONS

Apple, "UE Measurement in SCell Dormant State", Oct. 18, 2019, R2-1912465, 3GPP TSG-RAN WG2 Meeting #107bis, Chongqing, China, all pages (Year: 2019).*

(Continued)

*Primary Examiner* — Ayaz R Sheikh  
*Assistant Examiner* — Tarell A Hampton  
(74) *Attorney, Agent, or Firm* — Arent Fox, LLP

(57) ABSTRACT

This disclosure provides systems, methods and apparatus, including computer programs encoded on computer storage media, for a user equipment (UE) entering a dormant state with respect to a secondary cell group (SCG) of a node (Continued)

network (SN) having a primary serving cell (PSCell). In one aspect, the UE may maintain a parameter set for at least the PSCell while the UE is in the dormant state with respect to the SCG. For example, the UE may receive a parameter change message from either the SN or a master network (MN) and transmit a parameter change acknowledgment to either the SN or the MN. The parameter change message may be transmitted as one or both of a downlink control information (DCI) or media access control (MAC) control element (CE). The UE may transmit physical layer measurements to the SN based on the parameter set.

24 Claims, 14 Drawing Sheets

(51) Int. Cl.
*H04W 52/02* (2009.01)
*H04W 72/232* (2023.01)

(58) Field of Classification Search
CPC ..... H04L 5/0032; H04L 5/0091; H04L 5/001; H04L 5/0026; H04W 52/0235; H04W 72/232; H04W 52/0229; Y02D 30/70
See application file for complete search history.

(56) References Cited

U.S. PATENT DOCUMENTS

| | | | |
|---|---|---|---|
| 2014/0071931 A1* | 3/2014 | Lee | H04W 72/21 370/329 |
| 2015/0304957 A1* | 10/2015 | Noh | H04W 52/146 455/522 |
| 2016/0081020 A1 | 3/2016 | Rahman et al. | |
| 2017/0230232 A1* | 8/2017 | Liu | H04W 24/10 |
| 2019/0074882 A1 | 3/2019 | Zhou et al. | |
| 2019/0215712 A1 | 7/2019 | Babaei et al. | |
| 2019/0306739 A1* | 10/2019 | Kim | H04W 72/0453 |
| 2020/0037248 A1* | 1/2020 | Zhou | H04L 5/0032 |
| 2020/0145164 A1* | 5/2020 | Cheng | H04W 52/265 |
| 2020/0313833 A1* | 10/2020 | Yi | H04L 5/001 |
| 2021/0200792 A1 | 7/2021 | Ploegert et al. | |
| 2021/0400586 A1* | 12/2021 | Awoniyi-Oteri | H04W 52/287 |
| 2022/0116810 A1* | 4/2022 | Rugeland | H04W 28/0278 |
| 2022/0116874 A1* | 4/2022 | Xu | H04W 52/0225 |
| 2022/0116923 A1* | 4/2022 | Kim | H04L 5/0098 |
| 2022/0141904 A1* | 5/2022 | Yilmaz | H04L 5/0035 370/329 |
| 2023/0345314 A1* | 10/2023 | Harada | H04W 52/02 |

FOREIGN PATENT DOCUMENTS

| | | |
|---|---|---|
| CN | 110913422 A | 3/2020 |
| EP | 3920603 A1 | 12/2021 |
| WO | 2019236886 A1 | 12/2019 |
| WO | 2019242722 A1 | 12/2019 |

OTHER PUBLICATIONS

CATT, "Consideration on Dormant SCG State", Nov. 22, 2019, R2-1914531, 3GPP TSG-RAN WG2 Meeting #108, Reno, USA, all pages (Year: 2019).*
ZTE Corporation, Sanechips, "On SCG Suspension" Nov. 22, 2019, R2-1914823, , 3GPP TSG-RAN WG2 Meeting #108, Reno, USA, all pages (Year: 2019).*
Oppo, "Support of dormancy SCG", Nov. 22, 2019, R2-1914823, , 3GPP TSG-RAN WG2 Meeting #108, Reno, USA, all pages (Year: 2019).*
Qualcomm Incorporated, "Further discussion on suspension of SCG", R2-1914364, 3GPP TSG RAN WG2 Meeting #108, Reno, Nevada, US, Nov. 18-22, 2019, All pages. (Year: 2019).*
Intel Corporation, "Practical scoping of SCG suspension operation in Nr", R2-1914576, 3GPP TSG RAN WG2 Meeting #108, Reno, Nevada, US, Nov. 18-22, 2019, All pages. (Year: 2019).*
MediaTek Inc., "Discussion on UE behavior for stored SCell/SCG configuration", R2-1913921, 3GPP TSG-RAN WG2 #107bis, Chongqing, China, Oct. 14-18, 2019, All Pages (Year: 2019).*
ZTE Corporation, Sanechips, "On SCG Suspension", R2-1913491, 3GPP TSG-RAN WG2 Meeting #107bis, Chongqing, China, Sep. 14-18, 2019, All Pages (Year: 2019).*
CATT: "SCG Dormant State", 3GPP TSG-RAN WG2 Meeting #106, R2-1905881, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 13, 2019, May 17, 2019, 4 Pages, Section 2, paragraph [02.2].
Supplementary Partial European Search Report—EP20944464—Search Authority—Munich—Mar. 12, 2024.
VIVO: "UE behaviour for a suspended SCG", 3GPP TSG-RAN WG2 Meeting #108, R2-1914944, 3rd Generation Partnership Project, Mobile Competence Centre, 650, Route Des Lucioles, F-06921 Sophia-Antipolis Cedex, France, vol. RAN HG2, No. Reno, Nevada, USA, Nov. 18, 2019-Nov. 22, 2019, Nov. 8, 2019, XP051816883, 5 Pages, paragraph [02.1].
International Search Report and Written Opinion—PCT/CN2020/101456—ISA/EPO—Apr. 9, 2021.
Supplementary European Search Report—EP20944464—Search Authority—Munich—Jul. 29, 2024.
ZTE Corporation, et al., "On SCG Suspension", 3GPP TSG-RAN WG2 Meeting #107bis, R2-1913491, 3rd Generation Partnership Project, Mobile Competence Centre, 650, Route Des Lucioles, F-06921 Sophia-Antipolis Cedex, France, vol. RAN WG2, No. Chongqing, China, Sep. 14, 2019-Sep. 18, 2019, Oct. 4, 2019, 8 Pages, XP051805015, paragraphs [02.1], [003.].

\* cited by examiner

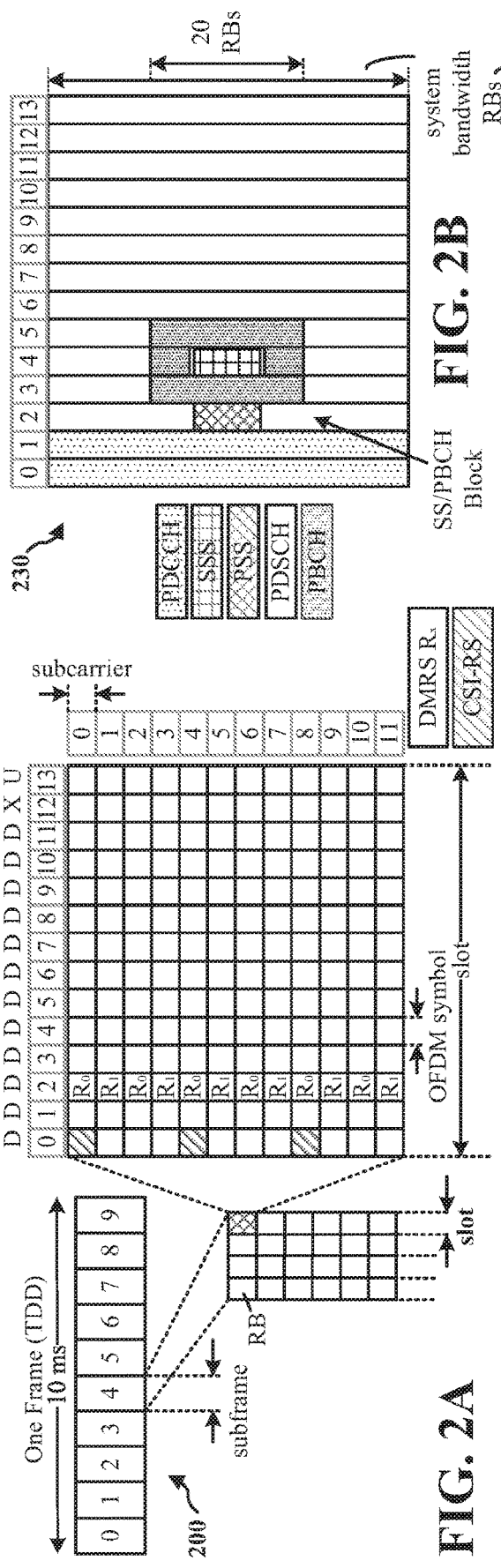
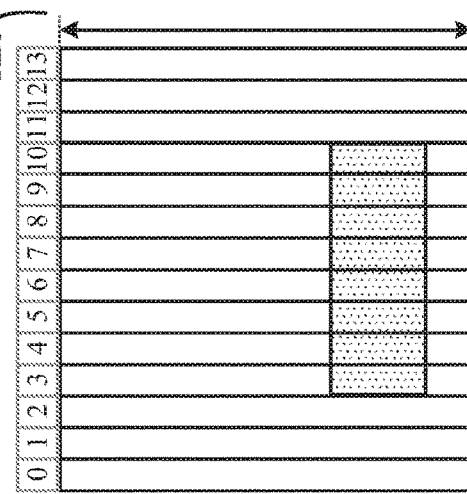
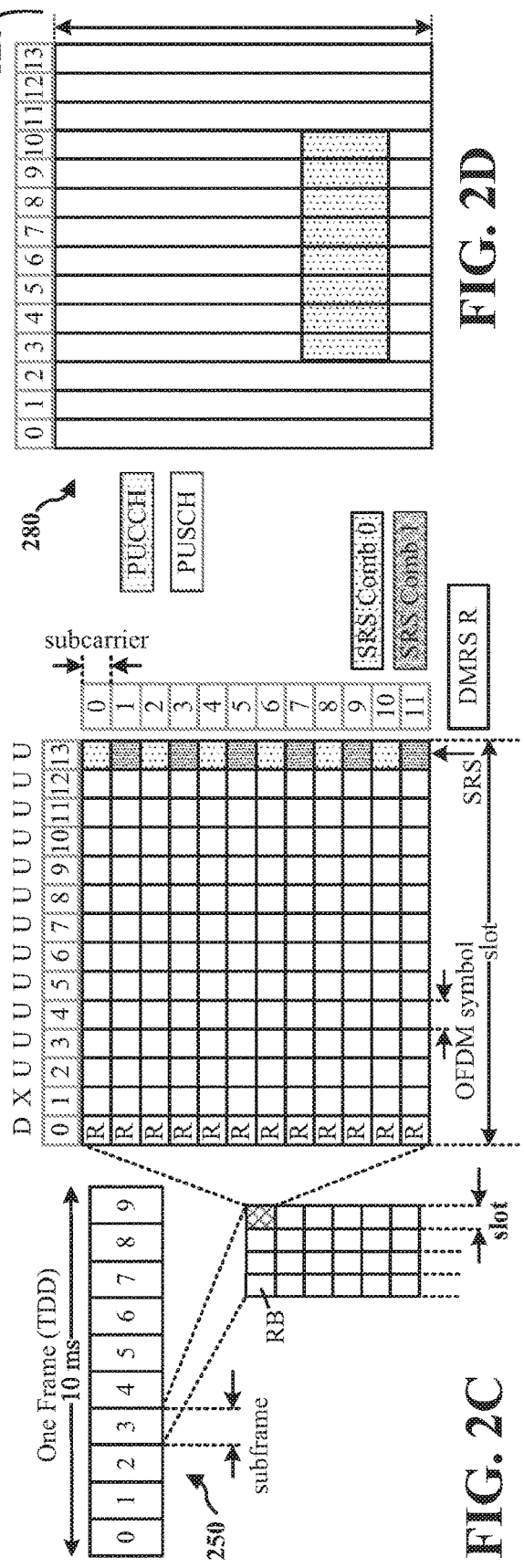

USER EQUIPMENT (UE) PHYSICAL LAYER MEASUREMENT REPORTING IN SECONDARY CELL GROUP (SCG) DORMANCY

This application is a 35 U.S.C. § 371 National Phase of International Patent Application No. PCT/CN2020/101456, entitled "USER EQUIPMENT (UE) PHYSICAL LAYER MEASUREMENT REPORTING IN SECONDARY CELL GROUP (SCG) DORMANCY" and filed on Jul. 10, 2020, the disclosure of which is hereby incorporated by reference in its entirety.

TECHNICAL FIELD present disclosure relates to user equipment (UE) measurement reporting in secondary cell group (SCG) dormancy.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method may include entering a dormant state with respect to a secondary cell group (SCG) of a secondary node (SN) having a primary serving cell (PSCell). The method may include maintaining a parameter set for the PSCell while the UE is in the dormant state with respect to the SCG. The method may include transmitting physical layer measurements to the SN based on the parameter set.

In some implementations, transmitting the physical layer measurements to the SN may include transmitting a physical uplink control channel (PUCCH) to the PSCell. In some implementations, the method may include transmitting a sounding reference signal (SRS) to the PSCell. The SRS may be multiplexed with the PUCCH.

In some implementations, maintaining the parameter set for the PSCell while the SCG is dormant for the UE includes: receiving a parameter change message from a master node (MN) including a master cell group (MCG); and transmitting a parameter change acknowledgment to the MN.

In some implementations, maintaining the parameter set for the PSCell while the SCG is dormant for the UE includes: receiving a parameter change message from the PSCell of the SN during a monitoring window after transmitting the physical layer measurements to the SN; and transmitting a parameter change acknowledgment to the SN.

In some implementations, receiving the parameter change message from the PSCell includes: monitoring a physical downlink control channel (PDCCH) during the monitoring window; receiving a downlink control information (DCI); and receiving a physical downlink shared channel including a media access control (MAC) control element (CE) based on the DCI.

In some implementations, receiving the parameter change message from the PSCell includes: monitoring a PDCCH during the monitoring window; and receiving a DCI indicating a parameter change.

One innovative aspect of the subject matter described in this disclosure can be implemented in a method of wireless communication at an apparatus of a PSCell associated with a SCG. The method may include determining that a UE has entered a dormant state with respect to a SN, where the SN includes the PSCell and the SCG. The method may include maintaining a parameter set for the UE for at least the PSCell while the UE is in the dormant state with respect to the SCG. The method may include receiving physical layer measurements from the UE based on the parameter set.

In some implementations, receiving the physical layer measurements from the UE includes receiving a PUCCH from the UE. The method also may include receiving a SRS from the UE. The SRS may be multiplexed with the PUCCH.

In some implementations, maintaining the parameter set for the PSCell while the SCG is dormant for the UE includes: determining a parameter change based on one or more of the physical layer measurements, the PUCCH, or the SRS; transmitting a parameter change message from the PSCell during a monitoring window after receiving the physical layer measurements; and receiving a parameter change acknowledgment from the UE.

In some implementations, transmitting the parameter change message includes: transmitting a DCI on a physical downlink control channel (PDCCH) during the monitoring window; and transmitting a physical downlink shared channel (PDSCH) including a MAC-CE based on the DCI.

In some implementations, transmitting the parameter change message includes transmitting a DCI indicating the parameter change on a PDCCH during the monitoring window.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

Like reference numbers and designations in the various drawings indicate like elements.

DETAILED DESCRIPTION

Figure 1:
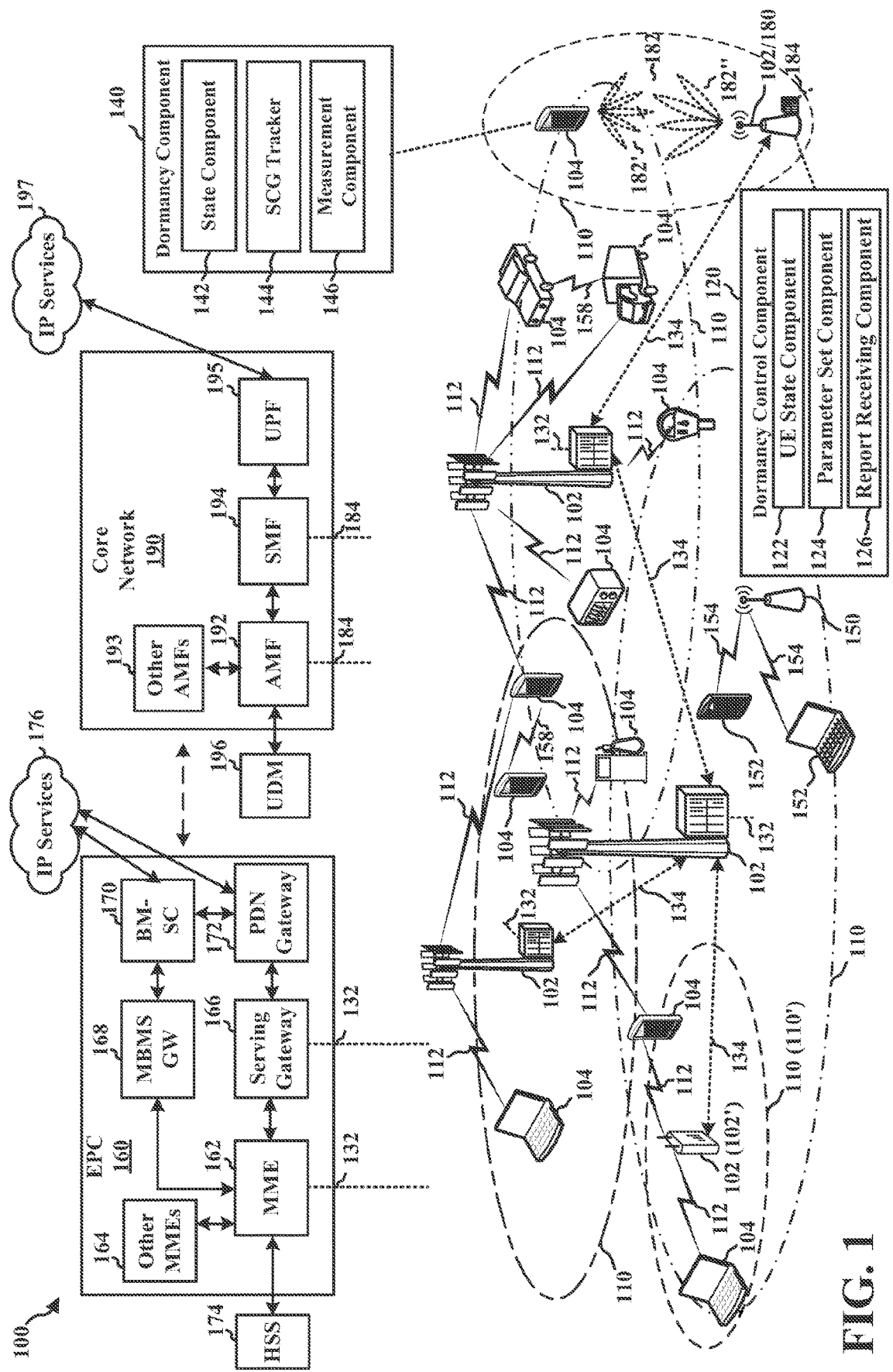
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

Multiple-radio dual-connectivity (MR-DC) may allow a user equipment (UE) to communicate with two radio access networks (RANs), for example, utilizing two frequency bands. One radio network may be provided by a master node (MN) and the other network may be provided by a secondary node (SN). The UE may communicate with a group of cells in each network. For example, the MN may include a master cell group (MCG) and the SN may include a secondary cell group (SCG). In some scenarios, the SCG for the UE may be dormant. For instance, when a data rate for the UE is sufficiently low, the SCG for the UE may be placed in a dormant state. The dormant state may have reduced power consumption. For example, in the dormant state, the UE may not monitor a control channel for the SCG.

During a dormant state, however, the UE may perform measurements of one or more cells of the SCG and report the measurement to the SN. In some respects, the SCG dormancy may be similar to secondary cell dormancy in carrier aggregation (CA). In CA, the connection from the UE to the primary cell (PCell) remains active, so the UE may provide measurement reports for the secondary cells to the PCell. In contrast, in SCG dormancy, the connection between the UE and the primary serving cell (PSCell) of the SCG is dormant.

One option for reporting measurements during SCG dormancy is for the UE to transmit measurement reports for the SCG via the MN and MCG. However, because the MN and SN may be separate access networks, there may be additional latency involved in the measurement reporting. In particular, latency of physical layer measurements may reduce the usefulness of the measurements. Further, when the MN and the SN are not synchronized, physical layer measurements may not be useful.

Another option for reporting measurements during SCG dormancy is for the UE to transmit the measurement reports for the SCG to the PSCell of the SCG. Although the UE may not monitor a control channel of the SCG, the SCG may remain active and receive a physical uplink control channel (PUCCH) from the UE. Such uplink transmissions, however, may utilize a parameter set for the PSCell. In particular, the parameter set may include uplink transmission parameters such as cell timing, transmission control indicator (TCI) states, uplink transmit power, and spatial relation. The present disclosure provides for the UE and the PSCell to maintain the parameter set for the PSCell while the UE is dormant with respect to the SCG. The UE and the PSCell may utilize the parameter set for measurement reporting. For example, the UE may enter a dormant state with respect to a SCG of a SN having a PSCell. The PSCell may update the parameter set based on one or more received physical layer measurements. The UE may maintain a parameter set for at least the PSCell while the UE is in the dormant state with respect to the SCG based on parameter change messages from the SN. For example, the UE may receive a parameter change message from either the SN or the MN and transmit a parameter change acknowledgment to either the SN or the MN. The UE may transmit physical layer measurements to the SN based on the parameter set.

Particular implementations of the subject matter described in this disclosure can be implemented to realize one or more of the following potential advantages. A UE may achieve power savings by entering the dormant state with respect to the SCG. By maintaining a parameter set for at least the PSCell, the latency of returning to an active state with respect to the SCG may be reduced. For example, the UE may resume communications with the PSCell using the maintained parameter set upon activation without additional signaling, such as by tracking parameters or re-initializing loops. In some implementations, where the UE maintains a parameter set for SCells of the SCG, communications with the SCells also may be resumed upon activation. Further, maintaining a parameter set may ensure that a SCG link is not lost during the dormant state. Additional costs for maintaining the parameter set for the PSCell may be mitigated by use of a monitoring window that limits a time that the UE monitors the SCG.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

In some implementations, one or more of the UEs 104 may include a dormancy component 140 that reports measurements while the UE 104 is in a SCG dormancy state. For example, the UE 104 may enter the SGC dormancy state when scenarios such as low traffic on the network occur. The dormancy component 140 may include a state component 142 configured to cause the UE 104 to enter a dormant state with respect to a SCG of a SN having a PSCell; a SCG tracker 144 configured to maintain a parameter set for the PSCell while the UE 104 is in the dormant state with respect to the SCG; and a measurement component 146 configured to perform physical layer measurements and transmit the physical layer measurements to the SN based on the parameter set.

In some implementations, one or more of the base stations 102 may include a dormancy control component 120 that receives physical layer measurements from a UE 104 in an SCG dormancy state. The dormancy control component 120 may include a UE state component 122 configured to determine that a UE 104 has entered a dormant state with respect to a SN including the PSCell and the SCG; a parameter set component 124 configured to maintain a parameter set for the UE 104 for at least the PSCell while the UE 104 is in the dormant state with respect to the SCG, and a report receiving component 126 configured to receive physical layer measurements from the UE based on the parameter set.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as SI interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^u$ slots/subframe. The subcarrier spacing and symbol length/duration are a function of the numerology. The subcarrier spacing may be equal to 2$^u$*15 kHz, where u is the numerology 0 to 5. As such, the numerology u=0 has a subcarrier spacing of 15 kHz and the numerology u=5 has a subcarrier spacing of 480 kHz. The symbol length/duration is inversely related to the subcarrier spacing. FIGS. 2A-2D provide an example of slot configuration 0 with 14 symbols per slot and numerology u=2 with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
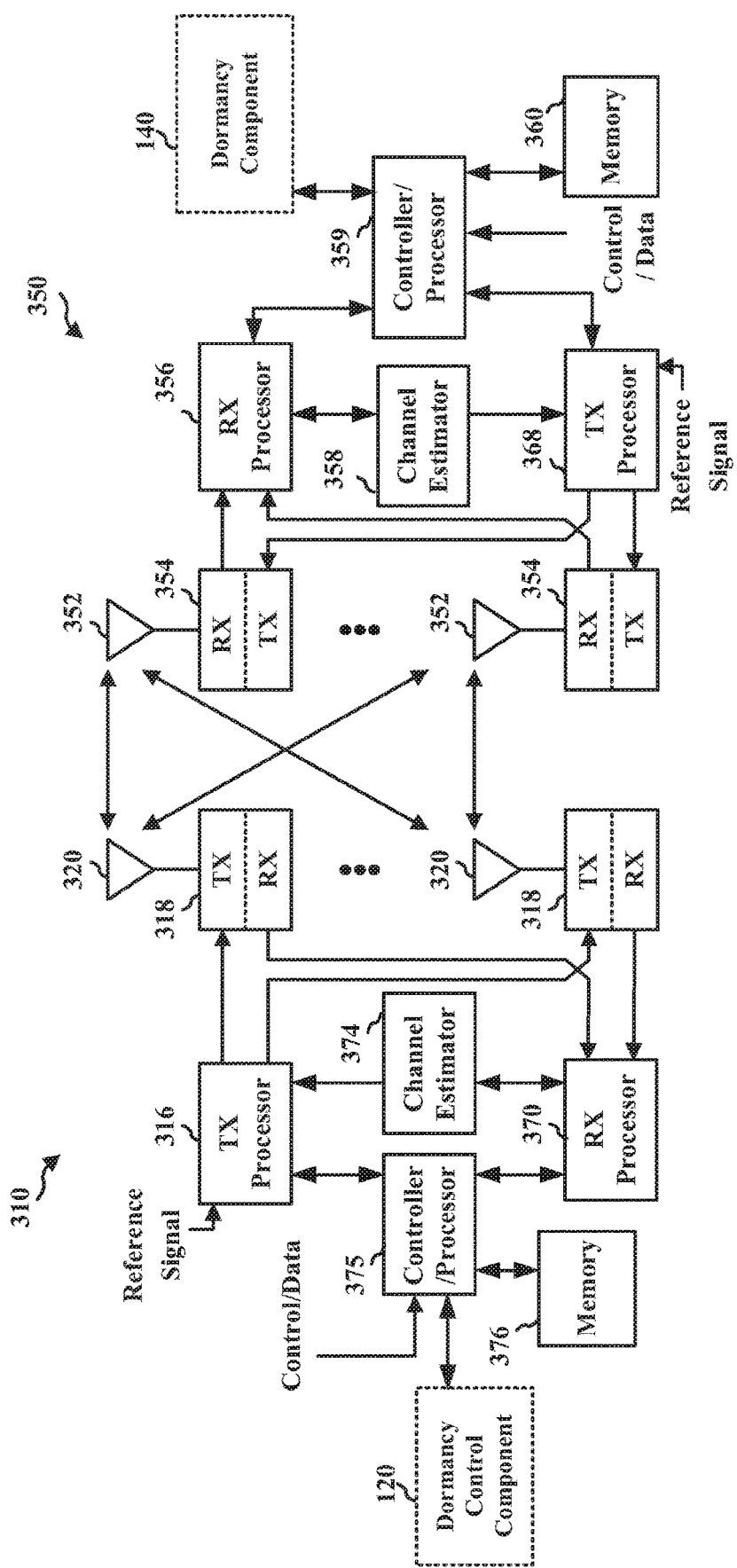
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the dormancy component 140 of FIG. 1.

At least one of the TX processor 316, the RX processor 370, and the controller/processor 375 may be configured to perform aspects in connection with the dormancy control component 120 of FIG. 1.

Figure 4:
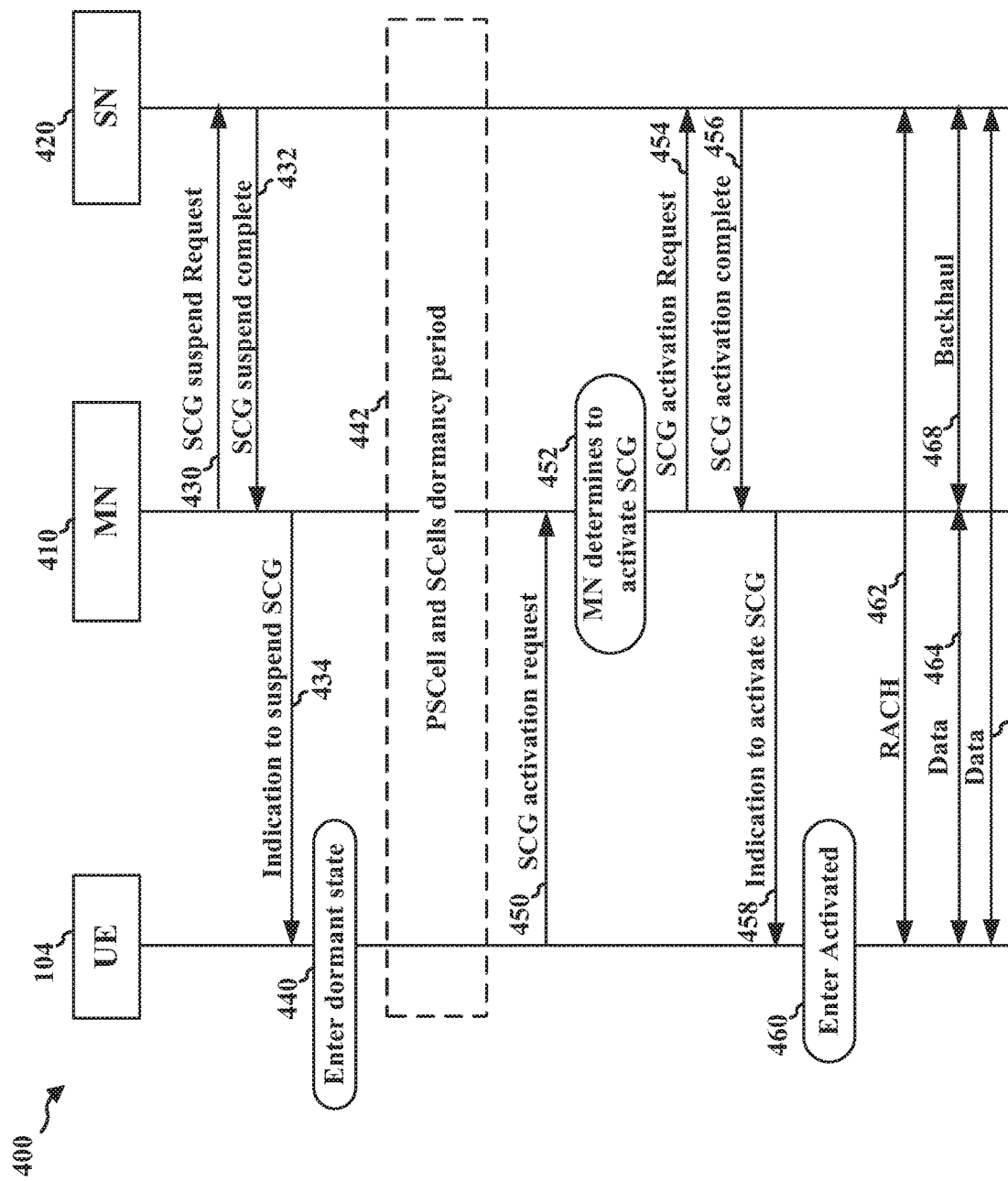
FIG. 4 is a diagram illustrating example communications for suspension and activation of a secondary cell group (SCG).

FIG. 4 is a diagram 400 illustrating example communications for suspension and activation of a SCG. The SCG may be associated with a SN 420. The UE 104 may initially be in dual connectivity with the MN 410 and the SN 420. The MN 410 may send a SCG suspend request 430 to the SN 420. The SCG suspend request 430 may request that the SN 420 stop scheduling the UE 104 on the SCG. The SN 420 may send a SCG suspend complete message 432 indicating that SCG scheduling is suspended for the UE 104. The MN 410 may send an indication 434 to suspend the SCG to the UE 104. For example, the indication 434 may be an RRC message or MAC-CE.

At block 440, the UE 104 may enter a dormant state with respect to the SCG. For instance, the UE 104 may stop monitoring one or more control channels for the SCG. The UE 104 may power down one or more receive chain components to reduce power consumption in the dormant state. During a PSCell and SCells dormancy period 442, the UE 104 may perform measurements of the PSCell and SCells, but may not generally be scheduled to transmit or receive on the PSCell and SCells. In some implementations, the UE 104 may transmit measurements to the PSCell or receive parameter updates from the PSCell.

The UE 104 may transmit a SCG activation request 450. For example, the UE 104 may determine to request SCG activation based on channel conditions or a requested data rate. The MN 410 may determine whether to activate the SCG at block 452. The MN 410 may determine whether to activate the SCG in response to the SCG activation request 450 or based on network considerations. For example, the MN 410 may activate the SCG in order to shift downlink traffic load to the SN 420. The MN 410 may send an SCG activation request 454 to the SN 420. The SN 420 may respond with a SCG activation complete message 456. The MN 410 may transmit an indication 458 to activate the SCG to the UE 104. For example, the indication 458 may be an RRC message or MAC-CE.

At block 460, the UE 104 may enter an activated state with respect to the SCG. The UE 104 and the SN 420 may perform a RACH procedure 462 to establish a connection for the PSCell and the SCells. The UE 104 may then be in dual connectivity with the MN 410 and the SN 420 such that data may be transmitted either between the MN 410 and UE 104 on a connection 464 or between the SN 420 and the UE 104 on a connection 466. The MN 410 and the SN 420 may communicate via a backhaul 468

Figure 5:
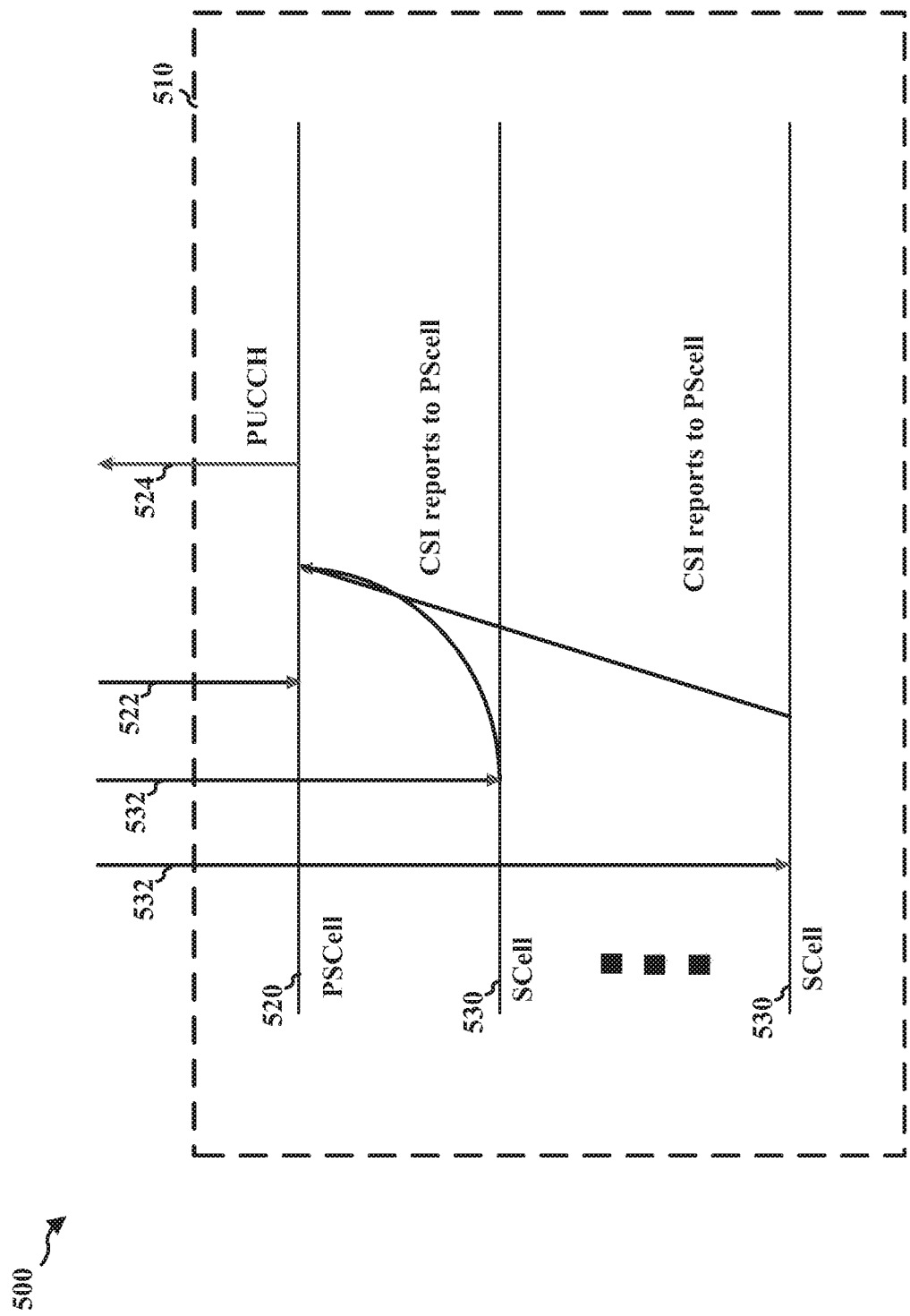
FIG. 5 is a diagram illustrating example UE measurements for a SCG.

FIG. 5 is a diagram 500 illustrating example UE measurements for an SCG 510. The SCG 510 may include a PSCell 520 and optional secondary cells 530. The UE 104 may be in a dormant state for the SCG 510. Accordingly, the UE 104 may perform the measurements during a periodic measurement window to generate a periodic measurement report. The PSCell 520 may receive downlink reference signal 522 (such as a channel state information reference signal (CSI-RS)) and perform channel state information (CSI) measurements. Similarly, the SCells 530 may receive respective downlink reference signals 532 and perform CSI measurements. To reduce signaling from the UE during the SCG dormancy state, the UE 104 may provide CSI measurement reports for the SCells 530 via the PSCell 520. For example, the UE 104 may transmit a physical uplink control channel (PUCCH) to the PSCell 520 that includes the CSI reports for the PSCell 520 and each SCell 530.

Figure 6:
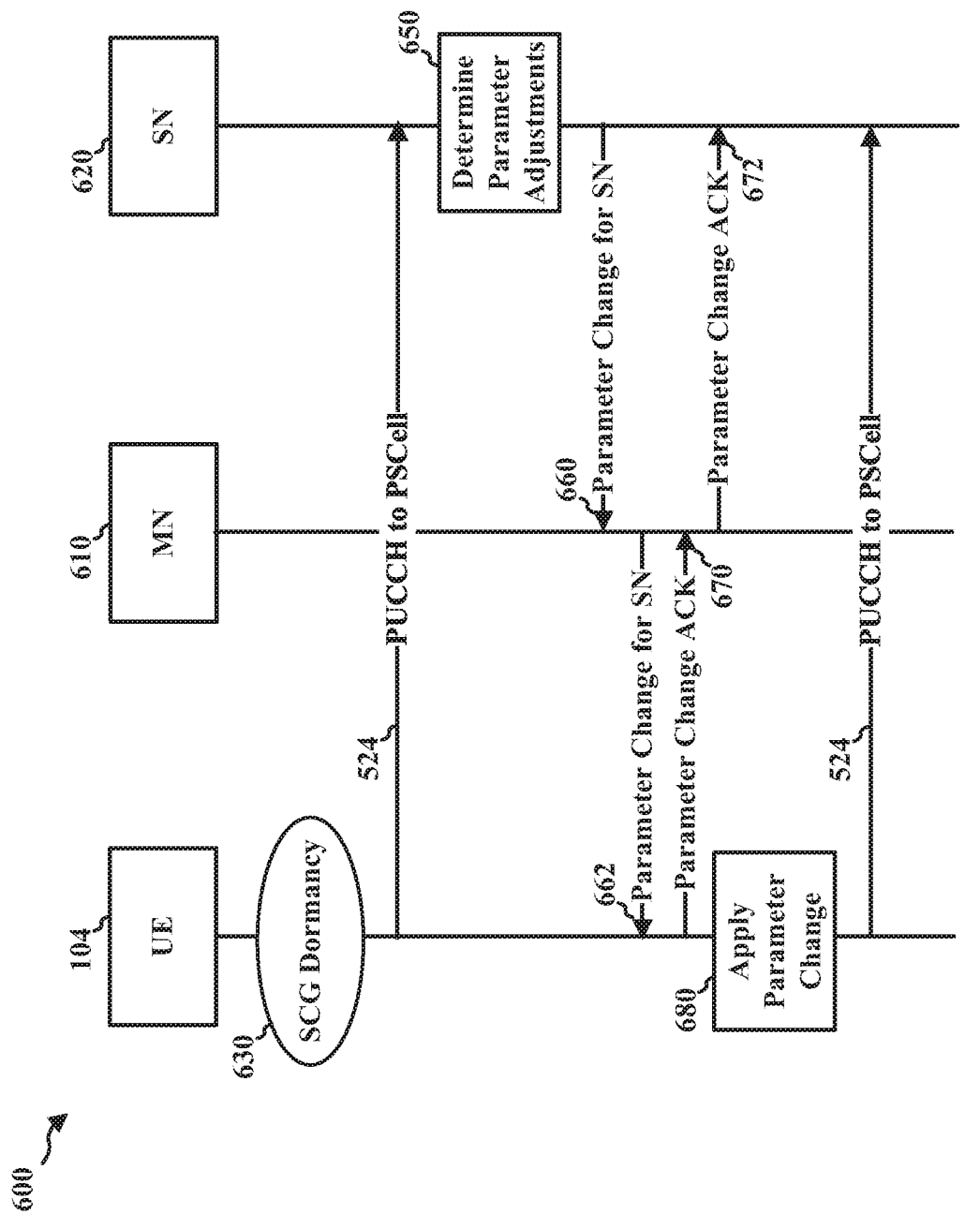
FIG. 6 is a diagram illustrating example parameter updates via a master node (MN) during SCG dormancy.

FIG. 6 is a diagram 600 illustrating example parameter updates via a MN 610 during SCG dormancy. The UE 104 and the SN 620 may maintain a set of parameters for the UE 104 to transmit the PUCCH 524 to the PSCell 520. For instance, at block 630, the UE 104 may enter an SCG dormancy state with respect to the SCG. The UE 104 may transmit a first PUCCH 524 to the PSCell 520, for example, based on parameters prior to entering the SCG dormancy state. In block 650, based on the physical layer measurements transmitted on the PUCCH 524, the SN 620 may determine one or more parameter adjustments to the set of parameters. For example, the SN 620 may change one or more uplink transmission parameters such as cell timing, TCI state, or uplink transmit power. For a parameter update via the MN 610, the SN 620 may transmit a parameter change message 660 to the MN 610 via a backhaul, and the MN 610 may transmit the parameter change message 662 to the UE 104. The UE 104 may acknowledge (ACK) the parameter change message 660 or 662 by transmitting a parameter change ACK 670 to the MN 610, which may then transmit a parameter change ACK 672 to the SN 620 via a backhaul.

At block 680, the UE 104 may apply the one or more parameter changes. In some implementations, the block 680 may occur before transmitting the parameter change ACK 670. After block 680, the UE 104 may transmit a subsequent PUCCH 524 using the updated parameter set. Accordingly, the UE 104 and the SN 620 may maintain the uplink transmission parameters. Additionally, the uplink transmission parameters may be utilized when the UE 104 exits the SCG dormancy state. For example, after receiving a command (such as indication 458) from the MN 610 to exit the SCG dormancy state, the UE 104 may utilize the uplink parameters to transmit a scheduling request. Because the uplink transmission parameters are maintained, the latency for communications after exiting the SCG dormancy state may be reduced.

Figure 7:
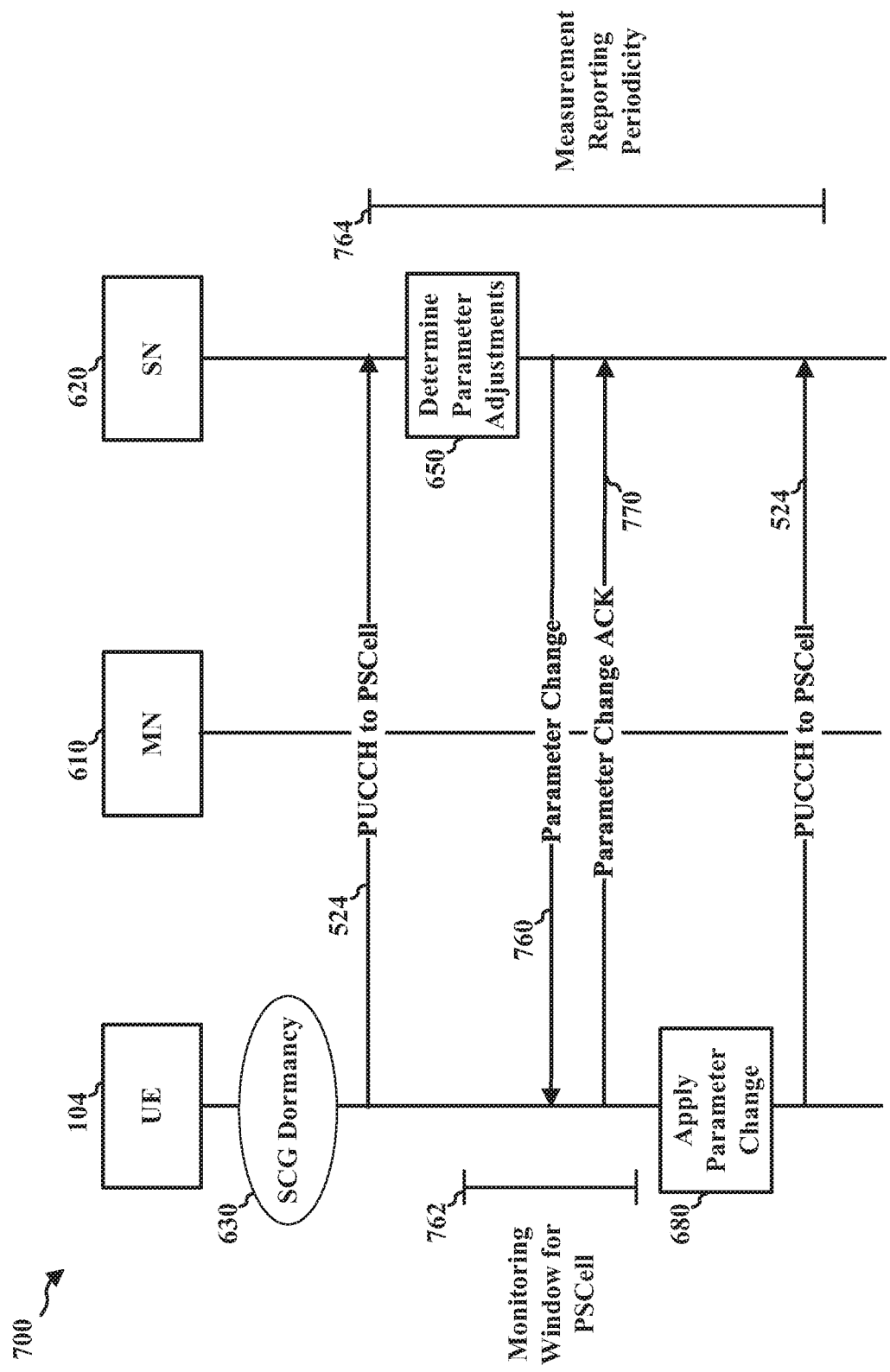
FIG. 7 is a diagram illustrating example parameter updates via a secondary node (SN) during SCG dormancy.

FIG. 7 is a diagram 700 illustrating example parameter updates via the SN 620 during SCG dormancy. In some implementations, direct communication between the SN 620 and the UE 104 may reduce latency compared to the procedures of FIG. 6, but with increased power consumption by the UE 104. The increase in power consumption, however, may be mitigated or reduced. Similar to FIG. 6, the UE 104 and the SN 620 may maintain a set of parameters for the UE to transmit the PUCCH 524 to the PSCell 520. For instance, at block 630, the UE 104 may enter the SCG dormancy state. The UE 104 may transmit the first PUCCH 524 to the SN 620 and the PSCell 520, and in block 650, based on the physical layer measurements, the SN 620 may determine a parameter adjustment to the set of parameters. For direct SN communications, the SN 620 may transmit a parameter change message 760 directly to the UE 104. Because the UE 104 is in SCG dormancy, the UE 104 may not normally monitor messages from the SN 620. In some implementations, the UE 104 may be configured with a monitoring window 762 for the PSCell. The monitoring window 762 may be based on the PUCCH 524 or may be configured for periodic monitoring. For example, the monitoring window 762 may start after a round trip time after transmitting the PUCCH 524 and extend for a relatively short period (such as 2-4 ms) to allow flexibility in scheduling by the PSCell. The monitoring window 762 may be relatively short compared to the measurement reporting periodicity 764, which may be, for example, 20 ms, 40 ms, 80 ms, or longer. Accordingly, the portion of time during which the UE 104 monitors the PSCell and consumes power may be relatively small compared to the measurement reporting periodicity 764. The UE 104 may transmit a parameter change ACK 770 in response to receiving the parameter change message 760. At block 680, the UE 104 may apply the one or more parameter changes. The UE 104 may transmit the PUCCH 524 using the new parameters after the block 680. In some implementations, the parameter change ACK 770 may be transmitted after the block 680 using the new parameters. For example, the parameter change ACK 770 may be included with the PUCCH 524 using the new parameters.

Figure 8:
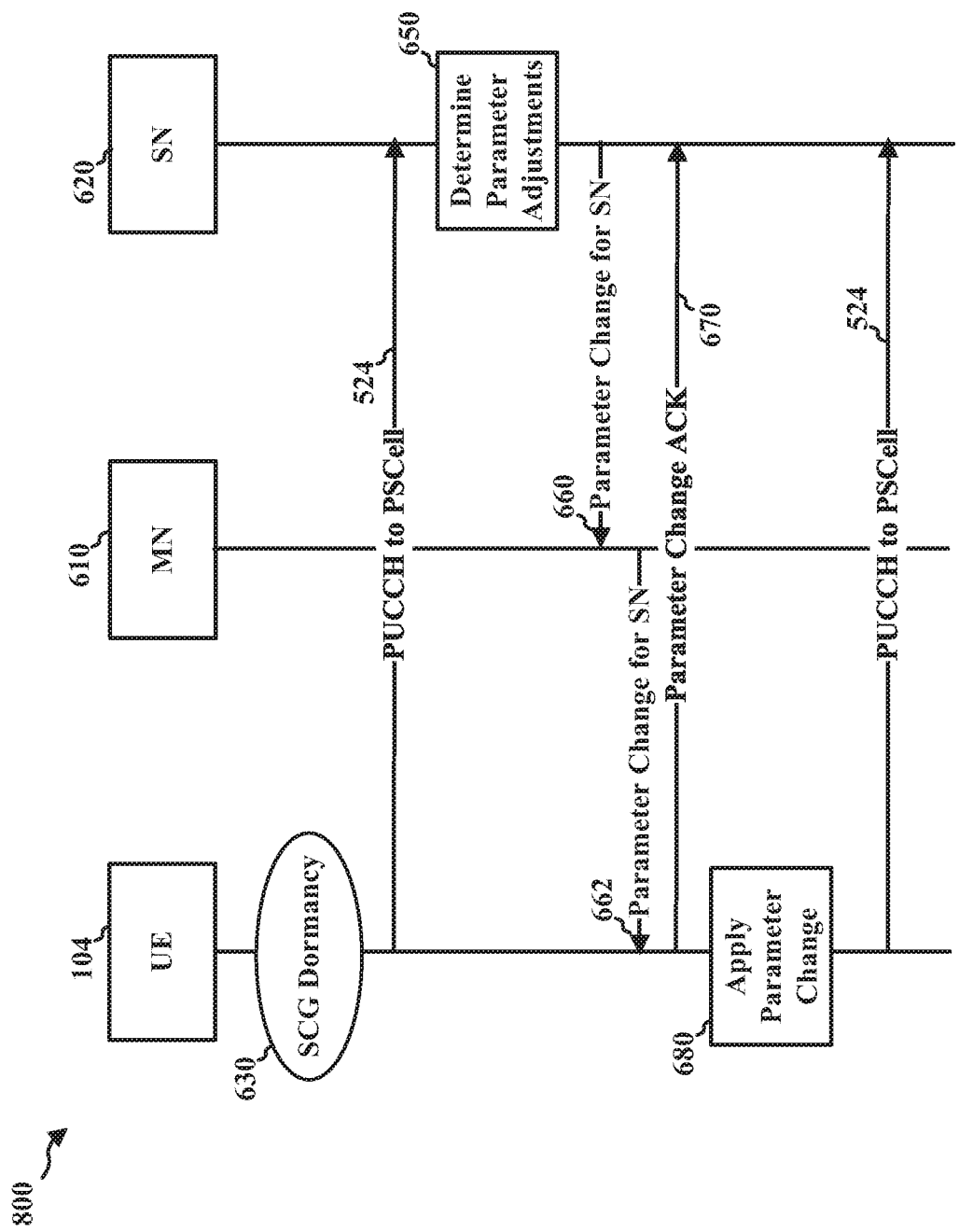
FIG. 8 is a diagram illustrating example parameter updates using hybrid communications during SCG dormancy.

FIG. 8 is a diagram 800 illustrating example parameter updates using hybrid communications during SCG dormancy. Similar to FIG. 6, the UE 104 and the SN 620 may maintain a set of parameters for the UE to transmit the PUCCH 524 to the PSCell 520. For instance, at block 630, the UE 104 may enter the SCG dormancy state. The UE 104 may transmit the first PUCCH 524 to the PSCell 520, and in block 650, based on the CSI measurement report, the SN 620 may determine one or more parameter adjustments to the set of parameters. For hybrid communications, the SN 620 may transmit the parameter change message 660 via the MN 610, but receive the parameter change ACK 770 directly from the UE 104. In particular, the SN 620 may transmit the parameter change message 660 to the MN 610, which may transmit the parameter change message 662 to the UE 104. Because the UE receives the parameter change message 662 from the MN 610, which is not dormant, the monitoring window 762 for the PSCell is not needed. The UE 104, however, may transmit the parameter change ACK 770 to the SN 620. The parameter change ACK 770 to the SN 620 may use approximately the same power as the parameter change ACK 670 to the MN 610, so there is no significant additional power consumption, but some decrease in latency compared to FIG. 6. The UE 104 may apply the parameter changes in block 680. Once again, the UE 104 may transmit the PUCCH 524 after the block 680 using the updated parameters. In some implementations, the parameter change ACK 770 may be transmitted after the block 680 with the PUCCH 524.

In some implementations, the parameter set may include one or more of: a timing advance, PUCCH power, SRS power, downlink TCI states, and PUCCH spatial relation. The UE 104 and the PSCell may maintain the parameter set for at least the PSCell so that the PSCell may receive the PUCCH and provide parameter updates. The UE and the PSCell also may maintain a parameter set for one or more SCells. The parameter set for SCells may allow reduced latency when returning from SCG dormancy. The following table shows which parameters may be updated during SCG dormancy.

TABLE 1

| Parameter | PSCell | SCells |
|---|---|---|
| Timing | Yes based on PUCCH and SRS Tx | Yes (if SCell belongs to the same TAG ID as the PSCELL) No (if SCell belongs to different TAG ID as PSCELL) |
| PUCCH Power | Yes based on PUCCH Tx | No |
| SRS Power | Yes based on SRS Tx | |
| DL TCI States | Yes based on L1 measurements reports | Yes based on L1 measurements reports |
| PUCCH Spatial Relation | Yes derived from SRS (for cases with no beam correspondence) Yes derived from L1 measurements (for cases with beam correspondence) | No Yes derived from L1 measurements (for cases with beam correspondence) |

As shown in Table 1, the parameter set for the PSCell may be maintained based on PUCCH, SRS, and L1 measurement reports. For the SCells, the UE 104 may not transmit PUCCH or SRS, so only the L1 measurement reports may be available, as discussed with respect to FIG. 5. Accordingly, as shown in Table 1, the DL TCI state may be maintained, the PUCCH spatial relation may be maintained in cases with beam correspondence, and the timing may be maintained if the SCell is in the same TAG as the PSCell.

Several measures may provide power saving for maintaining the parameter set during SCG dormancy. As illustrated in FIG. 7, the monitoring window 762 may be used for receiving PDCCH from the PSCell. In cases where MAC-CE is used for parameter updates, the PDSCH also may be transmitted within the monitoring window 762 to reduce the DL monitoring power.

A dormant special bandwidth part (BWP) may be used by the PSCell for UEs in SCG dormancy. The dormant special BWP may be used for DL and UL and may be different than BWPs used by the SCells. For example, the dormant special BWP part may have a smaller bandwidth (such as fewer resource blocks (RBs) or subcarriers) than an active BWP. The dormant special BWP may have a greater bandwidth than a dormant BWP of a SCell.

As noted in Table 1, an SRS may be used to determine timing and PUCCH spatial relation for the PSCell. In some implementations, the SRS may be multiplexed with the PUCCH transmission. For example, the SRS may be interleaved with the PUCCH in the frequency domain to reduce active transmission time. Frequency, time, code, and spatial multiplexing schemes may be used. Other parameters may be based on L1 measurements and PUCCH. In some implementations, aperiodic L1 measurements may be configured and periodic L1 measurements may be suspended or the measurement reporting periodicity 764 may be increased. The aperiodic measurements of the PSCell or the SCell may be triggered by the PSCell.

The PSCell may operate with reduced functionality for UEs in SCG dormancy. For example, the PSCell may provide or schedule fewer channels than for a connected mode UE. As noted, to maintain the parameter set, the UE may transmit PUCCH and SRS. In some implementations, the UE may not transmit an uplink data channel such as PUSCH or associated uplink MAC-CE signaling. Table 2 shows various modes that the PSCell may operate in depending on the downlink parameter update signaling.

TABLE 2

| Channel Direction | PSCell MODE 1 | PSCell MODE 2 | PSCell MODE 3 |
|---|---|---|---|
| DL | None | PDCCH PDSCH | PDCCH |
| UL | | PUCCH and SRS | |
| Signaling | | MAC CE + DCI-based Signaling | Modified DCI-based Signaling |

PSCell Mode 1 may be used for parameter updates via the MN as illustrated in FIG. 6 or for hybrid parameter updates as illustrated in FIG. 8. Because the parameter updates are signaled via the MN and associated channels, the PSCell may not need to transmit any UE specific downlink channels. Instead, MAC-CE and DCI based signals for updates to the parameter set may be transmitted via the MN. For signaling via the SN, either PSCell Mode 2 or PSCell Mode 3 may be used. In PSCell Mode 2, the PSCell may transmit both PDCCH and PDSCH. Accordingly, MAC-CE and DCI based signaling from the PSCell may be used for the parameter change message 760. In PSCell Mode 3, the PSCell may transmit only PDCCH. PSCell Mode 3 may reduce monitoring by the UE 104. The DCI based signaling may be modified to include parameter changes that have been conventionally transmitted on MAC-CE for connected mode operation. For example, a new DCI format or new radio network temporary identifier (RNTI) may be used for SCG dormancy. Table 3 shows example parameter change messages.

TABLE 3

| Parameter to be updated | PSCell Mode 1 and 2 | PSCell Mode 3 |
|---|---|---|
| Timing | PUCCH/SRS: TA-MAC CE | PUCCH/SRS: TA-DCI |
| Tx Power | PUCCH: TPC-DCI and TPset-MAC CE | PUCCH: TPC-DCI and TPset-DCI |
| | SRS: TPC-DCI and SRS set-DCI | SRS: TPC-DCI and SRS set-DCI |
| DL TCI States | PDCCH: MAC CE | PDCCH: DCI |
| | PDSCH: MAC CE and DCI | |
| Spatial Relation | PUCCH: MAC CE | PUCCH: DCI |

The PSCell may estimate timing through reception of the PUCCH or the SRS. The PSCell may update timing due to expiration of a TA timer, event driven TA when errors exceed a timing threshold, or periodic TA commands. For PSCell Mode 1 and Mode 2, timing advance may be signaled via a timing advance MAC-CE. The timing advance MAC-CE may include a timing advance group (TAG) ID and a timing advance command. An SCG may have up to 4 TAG IDs. For SCells that share the same TAG ID as the PSCell, the timing of the SCells may be maintained based on the TA for the PSCell. The TA for SCells that do not share a TAG ID with the PSCell may not be maintained during SCG dormancy. For PSCell Mode 1, the TA MAC-CE may be transmitted via the MN. For PSCell Mode 1, the TA MAC-CE may be transmitted by the PSCell during the monitoring window 762. For PSCell Mode 3, a modified DCI may include the TAG ID and the timing advance command.

The PSCell may determine power control for the PUCCH and SRS based on the respective received signals. Power control commands for the PUCCH and SRS may be transmitted using DCI-based signaling. In particular, power control commands for PUCCH may be carried on DCI format 1_0, 1_1 or DCI format 2_2 using the TPC PUCCH RNTI. For PSCell modes 1 and 2, a PUCCH power control parameter set may be transmitted to the UE through the PUCCH Resource ID of the PUCCH spatial relation activation/deactivation MAC-CE. For PSCell Mode 3, a modified DCI may include the PUCCH power control parameter set. For SRS power control, the power control commands may be carried on DCI format 1_0, 1_1, 2_2, or 2_3 using the TPC SRS RNTI. The SRS power control parameter set may be transmitted to the UE via the spatial relation indicator (SRI) field of DCI format 0_1.

For DL beamforming, the PSCell may determine a DL TCI state based on L1 measurement reports. For PSCell modes 1 and 2, a combination of MAC-CE and DCI signaling may be used to indicate the DL TCI state. A TCI State indication MAC-CE may activate one TCI state for PDCCH. A TCI state activation/deactivation MAC-CE may activate one or more TCI states for PDSCH. A TCI state may be identified by a TCI state ID. Conventionally, a TCI state indication MAC-CE is transmitted for a single cell. The TCI State indication MAC-CE may be extended to apply to multiple cells. For example, a TCI state change may be applicable to multiple SCells of the SCG. Accordingly, the extended MAC CE may include additional serving cell IDs. For PDSCH, a DCI format 1_1 may indicate a particular activated TCI state. For PSCell Mode 3, a modified DCI may include a TCI state ID field for PDCCH.

For UL beamforming, the PSCell may determine the PUCCH spatial relation based on the L1 measurements for cases with beam correspondence or derive the PUCCH spatial relation from received SRS from the UE. For PSCell Modes 1 and 2, the PSCell may transmit a PUCCH spatial relation activation/deactivation MAC-CE indicating the spatial relation in the PUCCH resource ID field. For PSCell Mode 3, the modified DCI may include a PUCCH resource ID field indicating the spatial relation.

Figure 9:
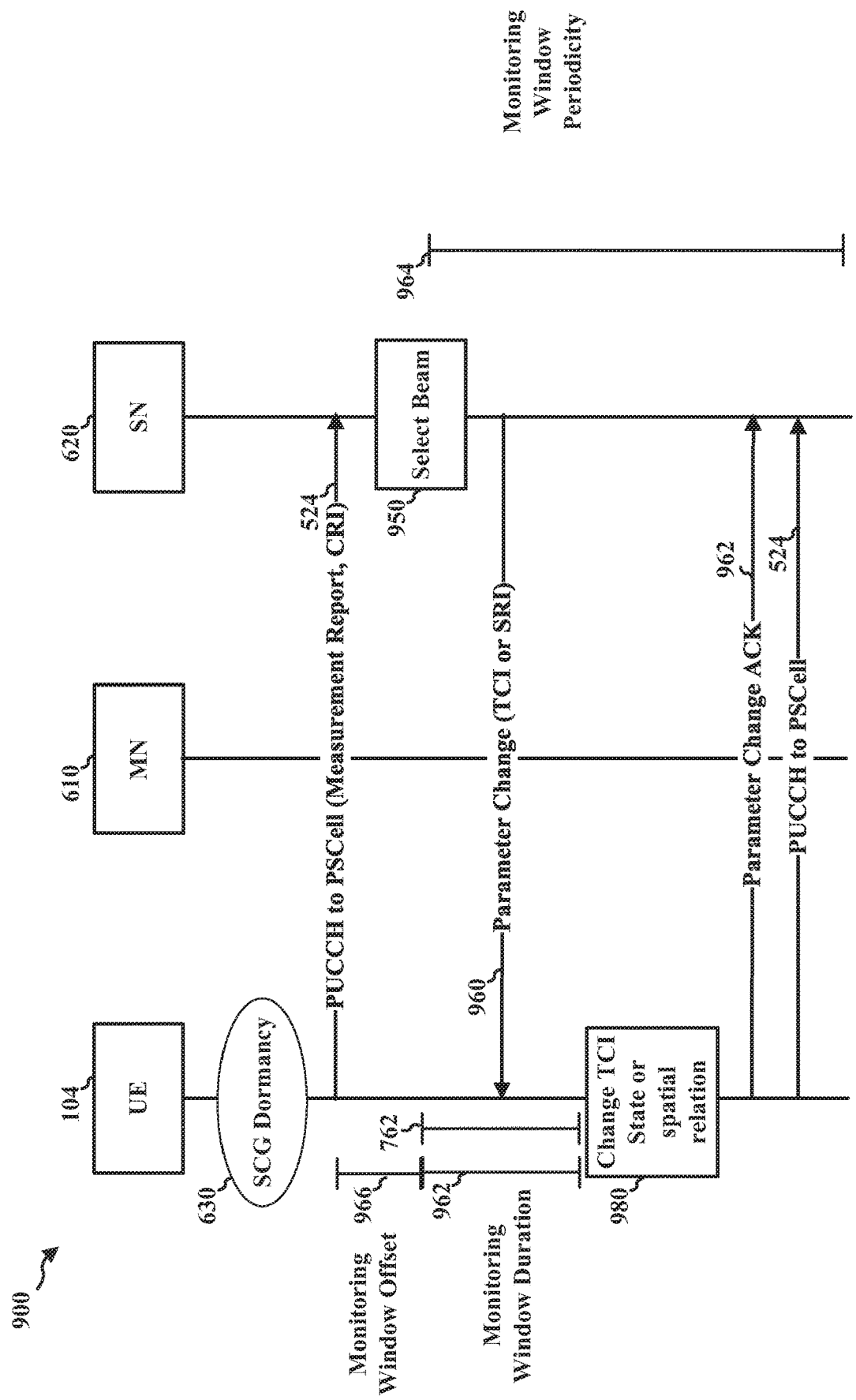
FIG. 9 is a diagram illustrating example parameter updates for beamforming during SCG dormancy.

FIG. 9 is a diagram 900 illustrating example parameter updates for beamforming during SCG dormancy. At block 630, the UE 104 may enter the SCG dormancy state. The UE 104 may transmit the first PUCCH 524 to the PSCell 520, and in block 950, based on the L1 measurements, the SN 620 may select a beam for DL beamforming, UL beamforming, or both. The SN 620 may transmit a parameter change message 960 directly to the UE 104 during the monitoring window 762. In some implementations, the monitoring window 762 may be defined by a duration 962. The monitoring window 762 may repeat after a monitoring window periodicity 964. In some implementations, the monitoring window periodicity 964 may be the same as the measurement reporting periodicity 764. In some implementations, the monitoring window 762 may start after a monitoring window offset 966 from the transmission of the PUCCH 524. In some implementations, the monitoring window 762 may be configured to reduce power consumption. For example, the monitoring window 762 may include a PDCCH monitoring duration during which the UE 104 is to monitor the PDCCH 524. The PDCCH monitoring duration may have a periodicity within the monitoring window 762. In some implementations, the UE 104 may receive a message within the monitoring window 762 indicating one or more PDCCH candidates not to monitor within the monitoring window 762. In some implementations, the monitoring window 762 includes a discontinuous reception (DRX) ON period and a DRX OFF period. The DRX on period and the DRX off period may be shorter than the duration 962 such that the monitoring window 762 may turn one or more receive chain components on and off during the monitoring window 762. The UE 104 may monitor the downlink channels such as PDCCH and PDSCH only in the DRX ON period. In some implementations, the UE 104 may monitor the PDCCH for a wake-up signal during a wake-up signal monitoring window. The UE 104 may enter the DRX ON state in response to receiving the wake-up signal or remain in the DRX OFF state if no wake up signal is received. The UE may enter the DRX OFF period after receiving a DCI without waiting for an inactivity timer.

As discussed, the parameter change message 960 may be a MAC-CE or a DCI. For DL beamforming, the parameter change message 960 may include a TCI state ID. For UL beamforming, the parameter change message 960 may include an SRI. The UE 104 may monitor the PDCCH for the parameter change message 960 during the monitoring window 762. At block 980, the UE 104 may apply the parameter change message 960 to update the TCI state or the spatial relation. For UL beamforming, the spatial relation may affect transmission of the parameter change ACK 962. In some implementations, the UE 104 may transmit the parameter change ACK 962 using the new spatial relation indicated by the parameter change message 960 after block 980. The UE 104 also may transmit the PUCCH 524 using the new spatial relation.

Figure 10:
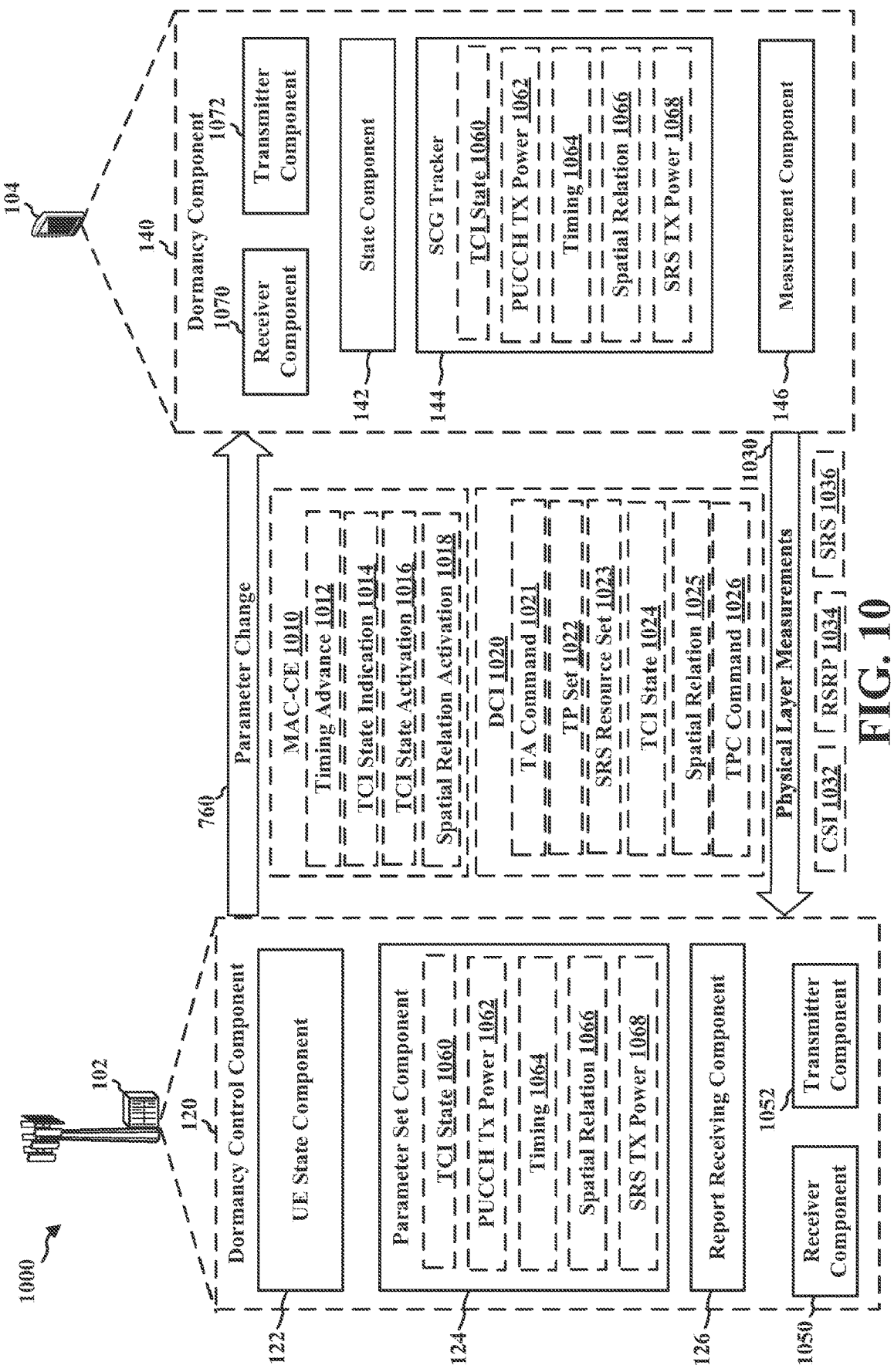
FIG. 10 is a diagram illustrating example communications and components of a BS and a UE.

FIG. 10 is a diagram 1000 illustrating example communications and components of a base station 102 and a UE 104. The UE 104 may include the dormancy component 140. The base station 102 may include the dormancy control component 120.

As discussed with respect to FIG. 1, dormancy component 140 may include the state component 142, the SCG tracker 144, and the measurement component 146. The dormancy component 140 also may include a receiver component 1070 and a transmitter component 1072. The receiver component 1070 may include, for example, a radio-frequency (RF) receiver for receiving the signals described herein. The transmitter component 1072 may include for example, an RF transmitter for transmitting the signals described herein. In some implementations, the receiver component 1070 and the transmitter component 1072 may be co-located in a transceiver.

The dormancy control component 120 may include the UE state component 122, the parameter set component 124, and the report receiving component 126. The dormancy control component 120 also may include a receiver component 1050 and a transmitter component 1052. The receiver component 1050 may include, for example, a RF receiver for receiving the signals described herein. The transmitter component 1052 may include for example, an RF transmitter for transmitting the signals described herein. In some implementations, the receiver component 1050 and the transmitter component 1052 may be co-located in a transceiver.

The parameter set component 124 at the base station 102 and the SCG tracker 144 at the UE 104 may each maintain a parameter set for at least the PSCell. The parameter set may include one or more of: a TCI state 1060, a PUCCH Tx power 1062, a timing 1064, a spatial relation 1066, or a SRS Tx power 1068. The dormancy control component 120 may determine whether any parameters of the parameter set should be updated. The dormancy control component 120 may transmit a parameter change message 760 to update one or more parameters of the parameter set.

The dormancy control component 120 may transmit the parameter change message 760 at either the MAC layer or the PHY layer. For example, at the MAC layer, the dormancy control component 120 may transmit a MAC control element (MAC-CE) 1010. The MAC-CE may be carried on PDSCH resources. Accordingly, the parameter change message 760 may be a MAC-CE for PSCell Mode 2, where the PSCell transmits PDSCH. The MAC-CE 1010 may include a timing advance MAC-CE 1012, a TCI state indication MAC-CE 1014, a TCI state activation MAC-CE 1016, or a spatial relation activation MAC-CE 1018. The timing advance MAC-CE 1012 may include a TAG ID and timing advance command. The timing advance MAC-CE 1012 may be expanded to include multiple TAG IDs and corresponding timing advance commands. The TCI state indication MAC-CE 1014 or the TCI state activation MAC-CE 1016 may be extended to indicate a TCI state for multiple serving cells (such as the PSCell 520 and one or more SCells 530). The spatial relation activation MAC-CE 1018 may include a PUCCH resource ID indicating a spatial relation for PUCCH.

For PSCell Mode 3, where the PSCell transmits only PDCCH, the dormancy control component 120 may transmit a DCI 1020. The DCI 1020 may include one or more of a TA command 1021, a TP set 1022, a SRS resource set 1023, a TCI state 1024, a spatial relation 1025, or a TPC command 1026. A conventional DCI (such as DCI format 1_1) may specify a single cell ID. The DCI 1020 may be expanded to include parameters for one or more SCells. For example, the DCI 1020 may include an additional field indicating whether the TCI state 1024 or the TPC command 1026 are applicable to other cells in the SCG. In another aspect, a new DCI format may be configured for a UE operating in the SCG dormancy state, or a different interpretation of a DCI format may be applied when the UE is operating in the SCG dormancy state. For example, the DCI 1020 may be scrambled with a dormancy RNTI and the fields of the DCI 1020 may be interpreted differently when scrambled with a dormancy RNTI. In some implementations, the DCI 1020 may be a two stage DCI including a first stage that indicates resources for a second stage including one or more parameters.

The dormancy component 140 may transmit physical layer measurements 1030 at the PHY layer. The physical layer measurements 1030 also may be referred to as L1 measurements. The physical layer measurements 1030 may be carried on the PUCCH 524. The PUCCH 524 may carry uplink control information (UCI) including an ACK/NACK, scheduling request (SR), or CSI 1032. The CSI 1032 may include the periodic measurements of the SCG. The physical layer measurements 1030 may include a reference signal received power (RSRP) 1034.

Figure 11:
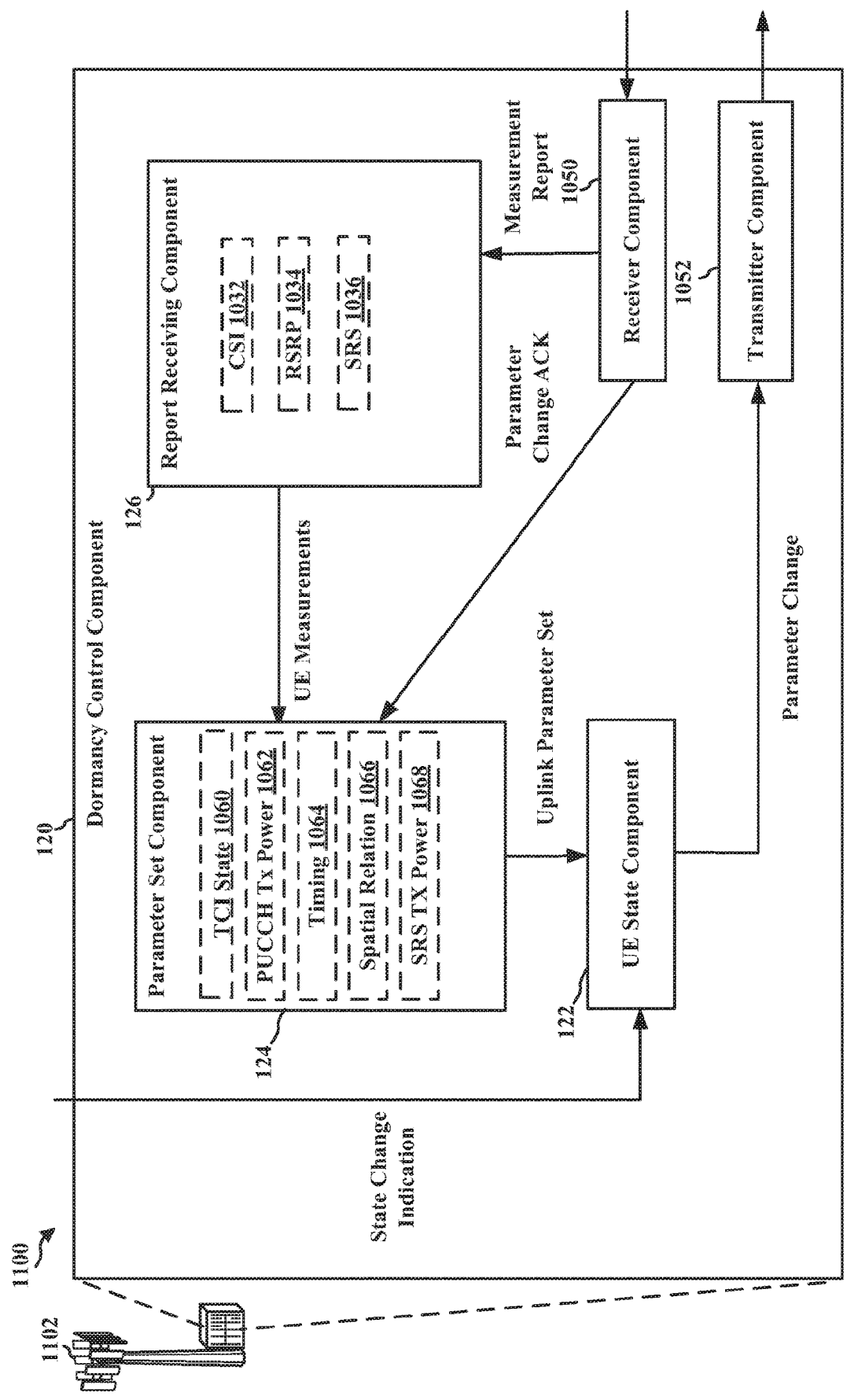
FIG. 11 is a conceptual data flow diagram illustrating the data flow between different means/components in an example BS.

FIG. 11 is a conceptual data flow diagram 1100 illustrating the data flow between different means/components in an example base station 1102, which may be an example of the base station 102 including the dormancy control component 120.

The receiver component 1050 may receive uplink signals from the UE 104 including the physical layer measurements 1030 and the parameter change ACK 770. The receiver component 1050 may provide the physical layer measurements 1030 to the report receiving component 126. The receiver component 1050 may provide the parameter change ACK 770 to the parameter set component 124.

The report receiving component 126 may receive the physical layer measurements 1030 from the receiver component 1050. The report receiving component 126 may extract measurements from the physical layer measurements 1030. For example, the report receiving component 126 may determine the CSI 1032 based on a UCI carried on the PUCCH 524. The report receiving component 126 may determine the RSRP 1034. The report receiving component 126 may provide the UE measurements to the parameter set component 124.

The parameter set component 124 may receive the UE measurements from the report receiving component 126 and the parameter change ACK 770 from the receiver component 1050. The parameter set component 124 may determine whether to adjust the uplink transmission parameters. For example, the parameter set component 124 may determine whether to change TCI state or spatial relation based on the UE measurements. The parameter set component 124 may determine whether to adjust the timing 1064 based on the CSI 1032. The parameter set component 124 may determine whether to change a TCI state 1060 based on the CSI 1032 or SRS 1036. If the parameter set component 124 changes any uplink parameters, the parameter set component 124 may provide the uplink parameter set to the UE state component 122.

The UE state component 122 may receive the uplink parameter set from the parameter set component 124. The UE state component 122 may receive a state change indication such as indication 434 or indication 458 from the MN 410 via a backhaul. For example, the MN 410 may transmit an RRC message to the UE indicating that the UE should enter the SCG dormancy state and send the state change indication to the PSCell. The UE state component 122 may determine that the UE 104 has entered the dormant state with respect to the SCG based on the state change indication. The UE state component 122 may determine how to transmit the parameter change message 660, 760, or 960 based on the state of the UE. For example, when the UE 104 is in the SCG dormancy state, the UE state component 120 may transmit the parameter change message 760 during the monitoring window 762 to the UE 104 via the transmitter component 1052. Alternatively, if the UE 104 is configured with communication via the MN 610 or hybrid communication, the UE state component 122 may transmit parameter change message 660 to the MN 610 via the transmitter component 1052 while the UE 104 is in the SCG dormancy state.

Figure 12:
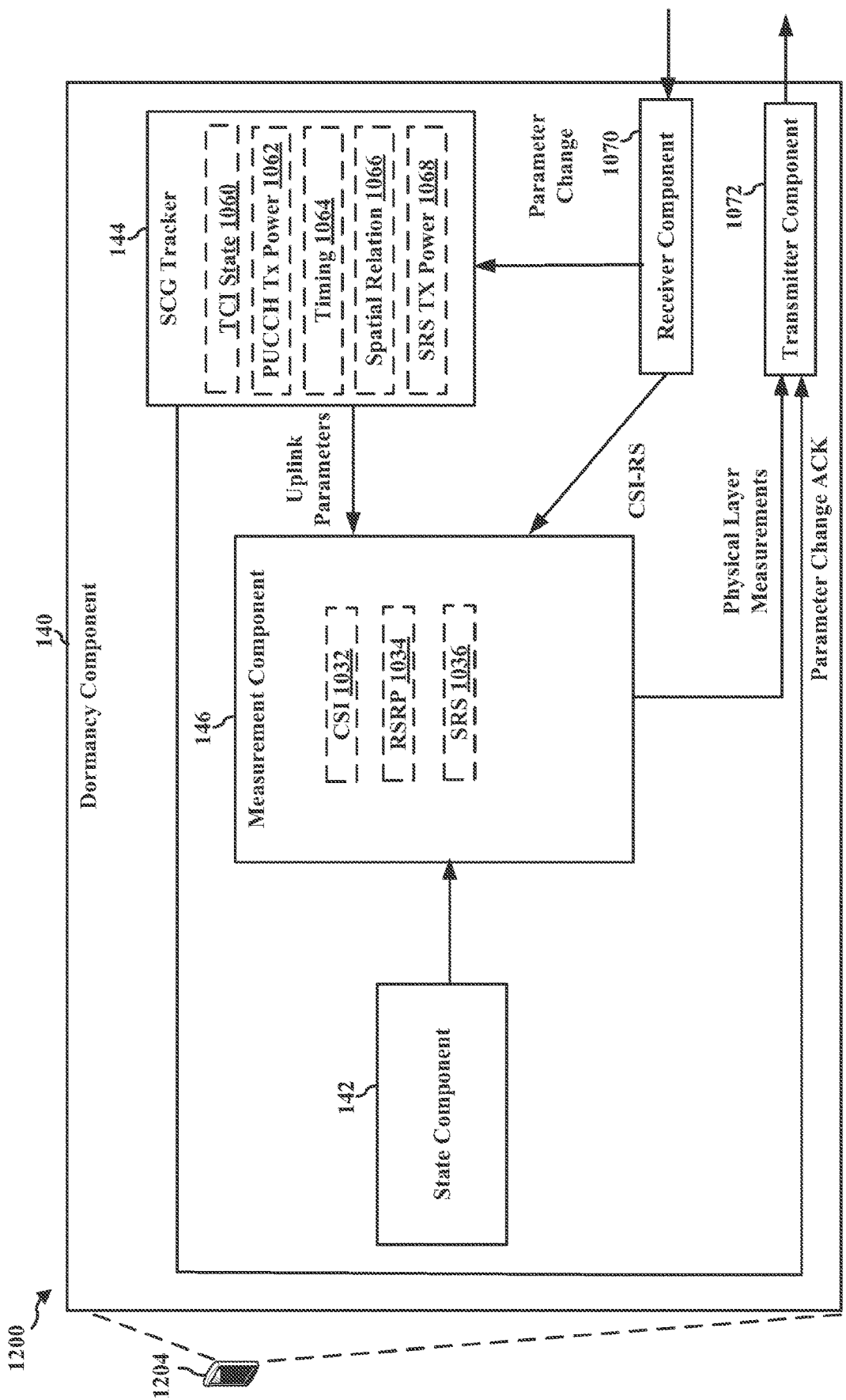
FIG. 12 is a conceptual data flow diagram illustrating the data flow between different means/components in an example UE.

FIG. 12 is a conceptual data flow diagram 1200 illustrating the data flow between different means/components in an example UE 104, which may be an example of the UE 104 and include the dormancy component 140.

The receiver component 1070 may receive the parameter change message 660, 760, or 960 and the CSI-RS from one or more base stations. The receiver component 1070 may provide the parameter change message 660, 760, or 960 to the SCG tracker 144. The receiver component 1070 may provide the CSI-RS to the measurement component 146.

The state component 142 may cause the UE 104 to enter the SCG dormancy state with respect to the SCG. For example, the state component 142 may receive an RRC command such as indication 434 from the MN 610 to enter the SCG dormancy state. The state component 142 may provide an indication of the SCG dormancy state to the measurement component 146. For example, the state component 142 may indicate the measurement reporting periodicity 764 to use during the SCG dormancy state.

The SCG tracker 144 may receive the parameter change message 660, 760, or 960 from the receiver component 1070. The SCG tracker 144 may extract uplink transmission parameters from the parameter change message 660, 760, or 960. For example, the SCG tracker 144 may determine the TCI state 1060 based on the TCI state indication MAC-CE 1014, TCI state activation MAC-CE 1016, or the TCI state 1024. The SCG tracker 144 may determine the TX power PUCCH Tx power 1062 based on the TPC command 1026. The SCG tracker 144 may determine the timing 1064 based on the timing advance MAC-CE 1012 or the TA command 1021. The SCG tracker 144 may determine the spatial relation 1066 based on the spatial relation activation MAC-CE 1018 or the spatial relation 1025. The SCG tracker 144 may determine the SRS Tx power 1068 based on the SRS resource set 1023. The SCG tracker 144 may provide the uplink parameters to the measurement component 146. The SCG tracker 144 may generate a parameter change ACK 670, 770, or 970 in response to the parameter change message 660, 760, or 960. In some implementations, the SCG tracker 144 may include the parameter change ACK 670, 770, or 970 in the physical layer measurements 1030 or PUCCH 524.

The measurement component 146 may receive the CSI-RS from the receiver component 1070 and may receive the uplink parameters from the SCG tracker 144. The measurement component 146 may measure the CSI-RS to determine the physical layer measurements 1030 such as the CSI 1032 and the RSRP 1034. The measurement component 146 may determine to transmit the physical layer measurements 1030 using the uplink parameters.

Figure 13:
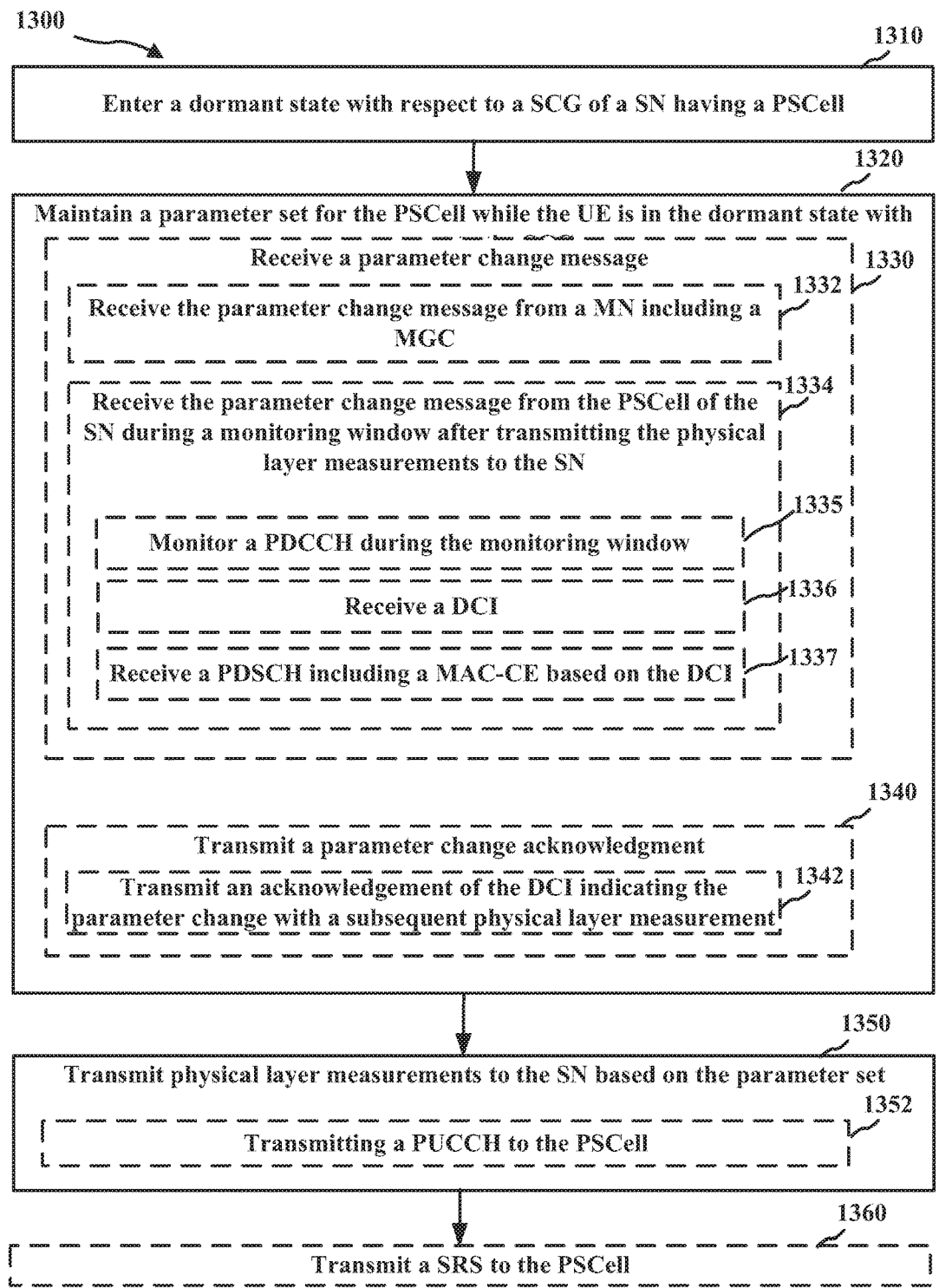
FIG. 13 is a flowchart of an example method for a UE to monitor cells of an SCG while operating in an SCG dormancy state.

FIG. 13 is a flowchart of an example method 1300 for a UE to monitor cells of an SCG while operating in an SCG dormancy state. The method 1300 may be performed by a UE (such as the UE 104, which may include the memory 360 and which may be the entire UE 104 or a component of the UE 104 such as the dormancy component 140, TX processor 368, the RX processor 356, or the controller/processor 359). The method 1300 may be performed by the dormancy component 140 in communication with the dormancy control component 120 of the base station 102.

At block 1310, the method 1300 may include entering a dormant state with respect to a SCG of a SN having a primary serving cell (PSCell). In some implementations, for example, the UE 104, the RX processor 356 or the controller/processor 359 may execute the dormancy component 140 or the state component 142 to cause the UE 104 to enter the dormant state with respect to the SCG 510 of the SN 620 having a PSCell 520. Accordingly, the UE 104, the RX processor 356, or the controller/processor 359 executing the dormancy component 140 or the state component 142 may provide means for entering a dormant state with respect to a SCG of a SN having a PSCell.

At block 1320, the method 1300 may include maintaining a parameter set for the PSCell while the UE is in the dormant state with respect to the SCG. In some implementations, for example, the UE 104, the RX processor 356 or the controller/processor 359 may execute the dormancy component 140 or the SCG tracker 144 to maintain the parameter set for the PSCell 520 while the UE 104 is in the dormant state with respect to the SCG 510.

In some implementations, at sub-block 1330, the block 1320 may include receiving a parameter change message. For example, the SCG tracker 144 may receive the parameter change message 662 from the MN 610 or the parameter change message 760 from the SN 620. For instance, in sub-block 1332, the SCG tracker 144 may receive the parameter change message 662 from the MN 610 including a MCG. As another example, in sub-block 1334, the SCG tracker 144 may receive the parameter change message 760 or 960 from the PSCell 520 of the SN 620 during a monitoring window 762 after transmitting physical layer measurements 1030 to the SN 620.

In some implementations, at sub-block 1335, the SCG tracker 144 may monitor a PDCCH during the monitoring window 762. In some implementations, the monitoring window 762 is configured with a periodicity and duration. The monitoring window may start after an offset from the transmission of the physical layer measurements report. In some implementations, monitoring the PDCCH during the monitoring window includes receiving a message within the monitoring window indicating one or more PDCCH candidates not to monitor within the monitoring window. The monitoring window may include a PDCCH monitoring duration during which the UE is to monitor the PDCCH. The PDCCH monitoring duration may have a periodicity. In some implementations, where the monitoring window includes a DRX ON period and a DRX OFF period, monitoring the PDCCH may include monitoring the PDCCH only in the DRX ON period. In some implementations, the UE 104 monitors the PDCCH when a wake-up signal is received during a wake-up signal monitoring window, otherwise, the UE 104 stays in the DRX OFF state. In some implementations, monitoring the PDCCH during the monitoring window includes entering the DRX off period after receiving a DCI without waiting for an inactivity timer. At sub-block 1336, the SCG tracker 144 receive a DCI 1020.

In some implementations, at sub-block 1337, the SCG tracker 144 may receive a PDSCH including a MAC-CE 1010 based on the DCI 1020. In some implementations, the MAC-CE 1010 may indicate the parameter change. The MAC-CE may be one of: a timing advance MAC-CE 1012, a transmission power parameter set MAC-CE, a TCI state indication MAC-CE 1014, a TCI state activation/deactivation MAC-CE 1016, or a spatial relation activation/deactivation MAC-CE 1018. When the MAC-CE is the TCI state activation/deactivation MAC-CE 1016, the MAC-CE 1016 may indicate TCI states for multiple cells of the SCG. The SCG tracker may receive the DCI 1020 indicating a selected TCI state for one or more of the multiple cells of the SCG.

In some implementations, the DCI 1020 may indicate the parameter change. The DCI 1020 may include one or more of: a timing advance command 1021, a TPC command 1026, a transmission power parameter set 1022, a SRS resource set 1023, a PDCCH TCI state 1024, a PDSCH TCI state, or a PUCCH spatial relation 1025. In some implementations, the DCI 1020 indicating the parameter change may be scrambled with a RNTI for SCG dormancy. In some implementations, the DCI indicating the parameter change is a two stage DCI including a first stage that indicates resources for a second stage including one or more parameters.

In some implementations, at sub-block 1340, the block 1320 may include transmitting a parameter change acknowledgment. For example, at sub-block 1342, the SCG tracker 144 may transmit an acknowledgement of the DCI 1020 indicating the parameter change with a subsequent physical layer measurement 1030.

Accordingly, in view of the foregoing, the UE 104, the RX processor 356, or the controller/processor 359 executing the dormancy component 140 or the SCG tracker 144 may provide means for maintaining a parameter set for the PSCell while the UE is in the dormant state with respect to the SCG.

At block 1350, the method 1300 may include transmitting physical layer measurements to the SN based on the parameter set. In some implementations, for example, the UE 104, the TX processor 368 or the controller/processor 359 may execute the dormancy component 140 or the measurement component 146 to transmit physical layer measurements 1030 to the SN based on the parameter set. For instance, at sub-block 1352, the measurement component 146 may transmit a PUCCH 524 to the PSCell 520. Accordingly, the UE 104, the TX processor 368, or the controller/processor 359 executing the dormancy component 140 or the state component 142 may provide means for transmitting physical layer measurements to the SN based on the parameter set.

In block 1360, the method 1300 may include transmitting a SRS to the PSCell. In some implementations, for example, the UE 104, the TX processor 368 or the controller/processor 359 may execute the dormancy component 140 or the transmitter component 1072 to transmit an SRS 1036 to the PSCell 520. The SRS 1036 may be multiplexed with the PUCCH 524. For example, one or more of: frequency, time, code, or spatial multiplexing schemes may be used to multiplex SRS 1036 with the PUCCH 524. In some implementations, the SRS 1036 and the PUCCH 524 may be transmitted on a dormant special BWP for the PSCell. Accordingly, the UE 104, the TX processor 368, or the controller/processor 359 executing the dormancy component 140 or the state component 142 may provide means for transmitting a SRS to the PSCell.

Figure 14:
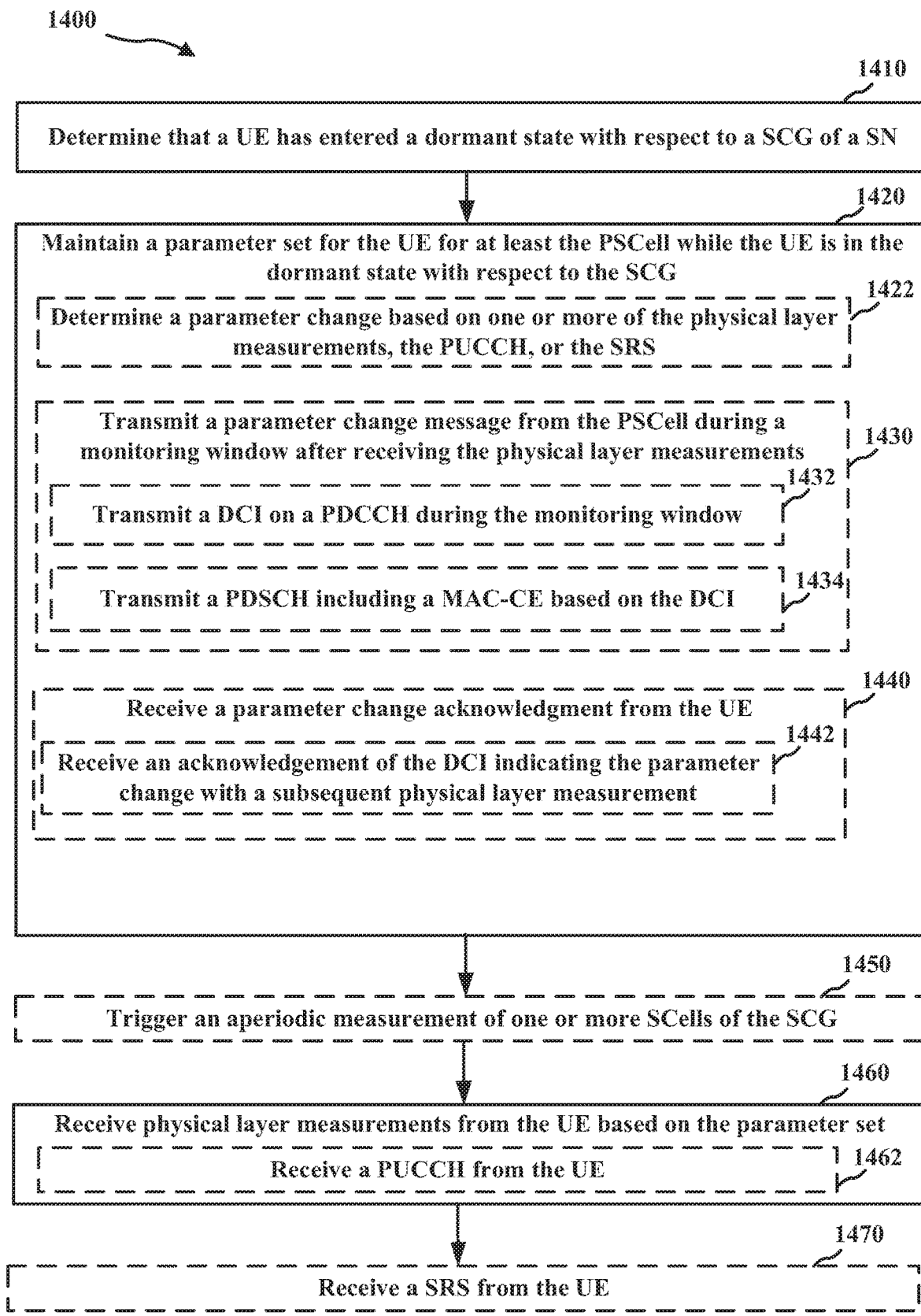
FIG. 14 is a flowchart of an example method for a base station to control a UE that is operating in an SCG dormancy state.

FIG. 14 is a flowchart of an example method 1400 for a base station to control a UE that is operating in an SCG dormancy state. The method 1400 may be performed by a base station (such as the base station 102, which may include the memory 376 and which may be the entire base station 102 or a component of the base station 102 such as the dormancy control component 120, TX processor 316, the RX processor 370, or the controller/processor 375). The method 1400 may be performed by the dormancy control component 120 in communication with the dormancy component 140 of the UE 104.

At block 1410, the method 1400 may include determining that a UE has entered a dormant state with respect to a SN. In some implementations, for example, the base station 102, the controller/processor 375, or the TX processor 316 may execute the dormancy control component 120 or the UE state component 122 to determine that the UE 104 has entered the dormant state with respect to the SN 620. The SN 620 may include the PSCell 520 and the SCG 510. Accordingly, the base station 102, the controller/processor 375, or the TX processor 316 executing the dormancy control component 120 or the UE state component 122 may provide means for determining that a UE has entered a dormant state with respect to a SN.

At block 1420, the method 1400 may include maintaining a parameter set for the UE for at least the PSCell while the UE is in the dormant state with respect to the SCG. In some implementations, for example, the base station 102, the controller/processor 375, or the TX processor 316 may execute the dormancy control component 120 or the parameter set component 124 to maintain the parameter set for the UE for at least the PSCell 520 while the UE 104 is in the dormant state with respect to the SCG. In some implementations, at sub-block 1422, the block 1420 may include determining a parameter change based on one or more of the physical layer measurements, the PUCCH, or the SRS. For example, the parameter set component 124 may determine the parameter change based on one or more of the physical layer measurements 1030, the PUCCH 524, or the SRS 1036.

In some implementations, at sub-block 1430, the block 1420 may include transmitting a parameter change message 760 from the PSCell during a monitoring window 762 after receiving the physical layer measurements 1030. For example, the parameter set component 124 may transmit the parameter change message 760 or 960. In some implementations, at sub-block 1432, the parameter set component 124 may transmit the DCI 1020 on a PDCCH during the monitoring window. In some implementations, at sub-block 1434, the parameter set component 124 may transmit a PDSCH including a MAC-CE based on the DCI.

In some implementations, at sub-block 1440, the block 1420 may include receiving a parameter change acknowledgment. For example, at sub-block 1442, the parameter set component 124 may receive an acknowledgement of the DCI 1020 indicating the parameter change with a subsequent physical layer measurement 1030.

Accordingly, in view of the foregoing, the base station 102, the controller/processor 375, or the TX processor 316 executing the dormancy control component 120 or the parameter set component 124 may provide means for maintaining a parameter set for the UE for the PSCell while the UE is in the dormant state with respect to the SCG.

At block 1450, the method 1400 may optionally include triggering an aperiodic measurement of one or more SCells of the SCG. In some implementations, for example, the base station 102, the controller/processor 375, or the TX processor 316 may execute the dormancy control component 120 or the transmitter component 1052 to trigger an aperiodic measurement of one or more SCells of the SCG. For example, the dormancy control component 120 may trigger the aperiodic measurement prior to an end of SCG dormancy. For instance, the dormancy control component 120 may trigger the aperiodic measurement in response to the SCG activation request 454. Accordingly, the base station 102, the controller/processor 375, or the TX processor 316 executing the dormancy control component 120 or the transmitter component 1052 may provide means for triggering an aperiodic measurement.

At block 1460, the method 1400 may include receiving physical layer measurements from the UE based on the parameter set. In some implementations, for example, the base station 102, the controller/processor 375, or the RX processor 370 may execute the dormancy control component 120 or the report receiving component 126 to receive physical layer measurements from the UE based on the parameter set. For instance, at sub-block 1462, the report receiving component 126 may receive the PUCCH 524 from the UE 104. Accordingly, the base station 102, the controller/processor 375, or the RX processor 370 executing the dormancy control component 120 or the report receiving component 126 may provide means for receiving physical layer measurements from the UE based on the parameter set.

At block 1470, the method 1400 may optionally include receiving a SRS from the UE. In some implementations, for example, the base station 102, the controller/processor 375, or the RX processor 370 may execute the dormancy control component 120 or the receiver component 1050 to receive a SRS 1036 from the UE 104. Accordingly, the base station 102, the controller/processor 375, or the RX processor 370 executing the dormancy control component 120 or the receiver component 1050 may provide means for receiving a SRS from the UE.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at an apparatus of by a user equipment (UE), comprising:
    entering a dormant state with respect to a secondary cell group (SCG) of a secondary node (SN) having a primary serving cell (PSCell);
    maintaining a parameter set associated with the PSCell while in the dormant state with respect to the SCG; and
    transmitting physical layer measurements to the SN based on the parameter set, wherein maintaining the parameter set associated with the PSCell while the SCG is dormant for the UE comprises:
        receiving, during a monitoring window and after transmitting the physical layer measurements to the SN, a parameter change message from:
            the PSCell of the SN, or
            a master node (MN); and
        transmitting an acknowledgment to the SN or the MN from which the parameter change message was received.

2. The method of claim 1, wherein the physical layer measurements are transmitted to the SN via a physical uplink control channel (PUCCH).

3. The method of claim 2, further comprising transmitting a sounding reference signal (SRS) to the PSCell, wherein the SRS is multiplexed with the PUCCH.

4. The method of claim 3, wherein transmitting the PUCCH and the SRS comprises transmitting the PUCCH and the SRS via a dormant special bandwidth part (BWP) associated with the PSCell.

5. The method of claim 1, wherein maintaining the parameter set associated with the PSCell while the SCG is dormant for the UE comprises:
    receiving the parameter change message from the MN; and
    transmitting the acknowledgment to the MN.

6. The method of claim 1, wherein maintaining the parameter set associated with the PSCell while the SCG is dormant for the UE comprises:
    receiving the parameter change message from the PSCell of the SN during the monitoring window after transmitting the physical layer measurements to the SN; and
    transmitting the acknowledgment to the SN.

7. The method of claim 6, wherein receiving the parameter change message from the PSCell comprises:
    monitoring a physical downlink control channel (PDCCH) during the monitoring window; and
    receiving a downlink control information (DCI).

8. The method of claim 7, wherein receiving the parameter change message from the PSCell further comprises receiving a physical downlink shared channel including a media access control (MAC) control element (CE) based on the DCI, the MAC-CE is one of: a timing advance MAC-CE, a transmission power parameter set MAC-CE, a PDCCH TCI state indication MAC-CE, a PDSCH TCI state activation/deactivation MAC-CE, or a PUCCH spatial relation activation/deactivation MAC-CE.

9. The method of claim 6, wherein the monitoring window is configured with a periodicity and duration, and the monitoring window starts after an offset from a transmission of the physical layer measurements to the SN.

10. A user equipment (UE), comprising:
    at least one transceiver;
    at least one memory configured to store instructions; and
    at least one processor communicatively configured to execute the instructions to cause the UE to:
        enter a dormant state with respect to a secondary cell group (SCG) of a secondary node (SN) having a primary serving cell (PSCell);
        maintain a parameter set associated with the PSCell while the UE is in the dormant state with respect to the SCG; and transmit, via the at least one transceiver, physical layer measurements for transmission to the SN based on the parameter set, wherein to maintain the parameter set associated with the PSCell while the SCG is dormant for the UE, the at least one processor is configured to:
  receive, via the at least one transceiver, during a monitoring window and after transmitting the physical layer measurements to the SN, a parameter change message from:
    the PSCell of the SN; or
    a master node (MN); and
  transmit, via the at least one transceiver, an acknowledgment to the SN or the MN from which the parameter change message was received.

11. The UE of claim 10, wherein the at least one processor is further configured to cause the UE to transmit, via the at least one transceiver, a physical uplink control channel (PUCCH) to the PSCell.

12. The UE of claim 11, wherein the at least one processor is further configured to cause the UE to transmit, via the at least one transceiver, a sounding reference signal (SRS) to the PSCell, wherein the SRS is multiplexed with the PUCCH.

13. The UE of claim 12, wherein the at least one processor is further configured to cause the UE to transmit the PUCCH and the SRS on a dormant special bandwidth part (BWP) for associated with the PSCell.

14. The UE of claim 10, wherein to maintain the parameter set associated with the PSCell while the SCG is dormant for the UE, the at least one processor is further configured to cause the UE to:
  receive the parameter change message from the MN; and
  transmit the acknowledgment to the MN.

15. The UE of claim 10, wherein to maintain the parameter set associated with the PSCell while the SCG is dormant for the UE, the at least one processor is further configured to cause the UE to:
  receive the parameter change message from the PSCell of the SN during the monitoring window after transmitting the physical layer measurements to the SN; and
  transmit the acknowledgment to the SN.

16. The UE of claim 15, wherein to receive the parameter change message from the PSCell, the at least one processor is further configured to cause the UE to:
  monitor a physical downlink control channel (PDCCH) during the monitoring window; and
  receive a downlink control information (DCI).

17. The UE of claim 16, wherein to receive the parameter change message from the PSCell, the at least one processor is further configured to cause the UE to receive a physical downlink shared channel including a media access control (MAC) control element (CE) based on the DCI, the MAC-CE is one of: a timing advance MAC-CE, a transmission power parameter set MAC-CE, a PDCCH TCI state indication MAC-CE, a PDSCH TCI state activation/deactivation MAC-CE, or a PUCCH spatial relation activation/deactivation MAC-CE.

18. The UE of claim 15, wherein the monitoring window is configured with a periodicity and duration, and the monitoring window starts after an offset from the transmission of the physical layer measurements to the SN.

19. An apparatus of a primary serving cell (PSCell) associated with a secondary cell group (SCG), comprising:
  at least one memory configured to store instructions; and
  at least one processor configured to execute the instructions to cause the apparatus to:
    receive an indication that a UE has entered a dormant state with respect to a secondary node (SN), wherein the SN includes the PSCell and the SCG;
    maintain a parameter set associated with the UE for at least the PSCell while the UE is in the dormant state with respect to the SCG; and
    receive physical layer measurements from the UE based on the parameter set, wherein to maintain the parameter set associated with the PSCell while the UE is in the dormant state with respect to the SCG, the at least one processor is configured to cause the apparatus to:
      change a parameter of the parameter set based on one or more of the physical layer measurements, a received physical uplink control channel (PUCCH), or a received sounding reference signal (SRS);
      output a parameter change message from the PSCell during a monitoring window after receiving the physical layer measurements; and
      receive an acknowledgment of the parameter change message from the UE.

20. The of claim 19, wherein the at least one processor is further configured to receive the PUCCH including the physical layer measurements from the UE.

21. The of claim 20, wherein the at least one processor is further configured to receive the SRS from the UE, wherein the SRS is multiplexed with the PUCCH.

22. The of claim 21, wherein the at least one processor is further configured to receive the PUCCH and the SRS on a dormant special bandwidth part (BWP) for the PSCell.

23. The of claim 19, wherein the at least one processor is further configured to trigger an aperiodic measurement of one or more secondary cells (SCells) of the SCG, wherein the physical layer measurements include physical layer measurements for the one or more SCells.

24. The of claim 19, further comprising at least one transceiver configured to receive the indication, receive the physical layer measurements, transmit the parameter change message, and receive the acknowledgment, wherein the apparatus is configured as network node.

* * * * *